United States Patent
Josephs et al.

(10) Patent No.: US 10,193,366 B2
(45) Date of Patent: Jan. 29, 2019

(54) RAPID BATTERY CHARGING

(71) Applicants: Chargetek, Inc., Camarillo, CA (US); POTENTIAL DIFERENCE, INC., Las Vegas, NV (US)

(72) Inventors: Louis C Josephs, Camarillo, CA (US); Elliott C. Small, Jr., Las Vegas, NV (US)

(73) Assignees: Potential Difference, Inc., Las Vegas, NV (US); Chargetek, Inc., Camarillo, CA (US)

( * ) Notice: Subject to any disclaimer, the term of this patent is extended or adjusted under 35 U.S.C. 154(b) by 255 days.

(21) Appl. No.: 14/993,923

(22) Filed: Jan. 12, 2016

(65) Prior Publication Data

US 2016/0204625 A1    Jul. 14, 2016

Related U.S. Application Data

(60) Provisional application No. 62/103,054, filed on Jan. 13, 2015, provisional application No. 62/102,497, filed on Jan. 12, 2015.

(51) Int. Cl.
*H02J 7/00* (2006.01)

(52) U.S. Cl.
CPC ............ *H02J 7/007* (2013.01); *H02J 7/0021* (2013.01); *H02J 7/0052* (2013.01); *H02J 7/0093* (2013.01)

(58) Field of Classification Search
CPC .................................................... H02J 7/007
USPC ........................................................ 320/139
See application file for complete search history.

(56) References Cited

U.S. PATENT DOCUMENTS

| 5,726,551 | A | * | 3/1998 | Miyazaki | ............ | B60L 11/1803 320/104 |
|---|---|---|---|---|---|---|
| 6,094,033 | A | * | 7/2000 | Ding | ..................... | H01M 10/44 320/132 |
| 6,229,285 | B1 | * | 5/2001 | Ding | ..................... | H01M 10/44 320/132 |
| 6,232,750 | B1 | * | 5/2001 | Podrazhansky | ....... | H02J 7/0093 320/139 |
| 6,841,974 | B2 | * | 1/2005 | Dykeman | ............. | H02J 7/0093 320/141 |
| 6,885,169 | B2 | * | 4/2005 | Dobbie | ................. | H01M 10/44 320/141 |

(Continued)

*Primary Examiner* — Samuel Berhanu
*Assistant Examiner* — Tessema Kebede
(74) *Attorney, Agent, or Firm* — Daniel J. Chalker; Chalker Flores, LLP

(57) ABSTRACT

A method and battery charger for charging one or more batteries includes a pulse generator, a detector and a processor communicably coupled to the pulse generator and the detector. A recovery/discharge circuit is electrically connected to each battery, and one or more energy storage devices are electrically connected to each of the recovery/discharge circuits. A charging pulse group, which includes a positive pulse, a rest period and a negative pulse, is determined based on one or more battery parameters using the processor and the detector. The charging pulse group is generated using the pulse generator, and sequentially applied to each of the batteries. Energy is recovered from each of the one or more batteries using the recovery/discharge circuits during the negative pulse, and the energy is stored in the one or more energy storage devices. The battery parameters are monitored and the charging pulse group may be adjusted.

29 Claims, 16 Drawing Sheets

(56) References Cited

U.S. PATENT DOCUMENTS

| | | |
|---|---|---|
| 8,368,357 B2 | 2/2013 | Ghantous et al. |
| 8,427,112 B2 | 4/2013 | Ghantous et al. |
| 8,513,921 B2 | 8/2013 | Berkowitz et al. |
| 8,638,070 B2 | 1/2014 | Maluf et al. |
| 8,669,738 B1* | 3/2014 | Powell ................ H02J 7/0093 320/107 |
| 8,791,669 B2 | 7/2014 | Ghantous et al. |
| 8,901,886 B2 | 12/2014 | Berkowitz et al. |
| 8,907,631 B1 | 12/2014 | Gurries et al. |
| 9,991,726 B2 | 6/2018 | Small, Jr. |
| 2015/0048796 A1* | 2/2015 | Sherstyuk ........... H01M 10/425 320/129 |
| 2016/0204624 A1 | 7/2016 | Small |

\* cited by examiner

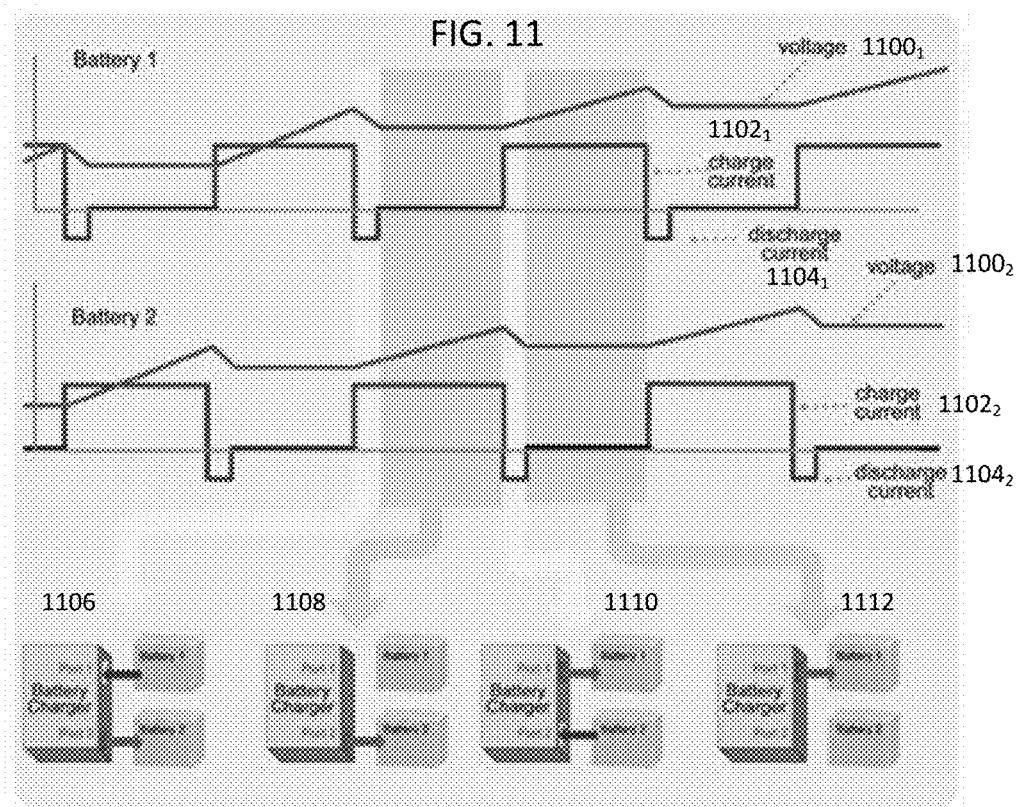
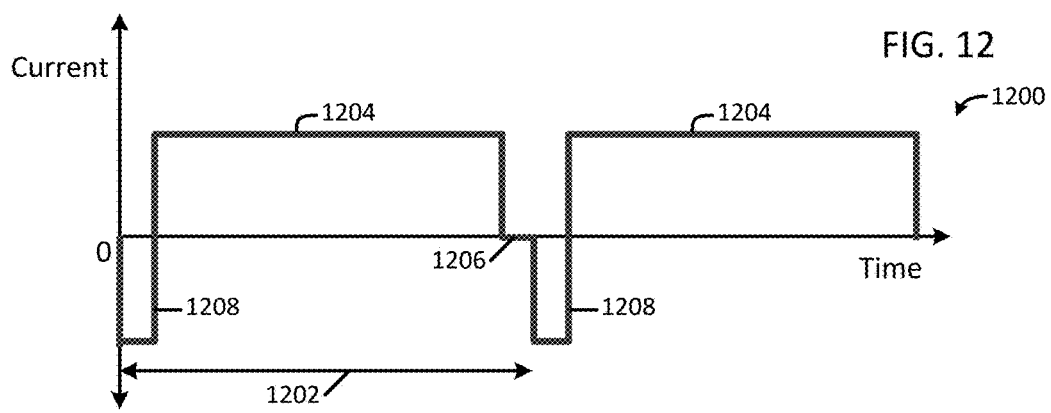
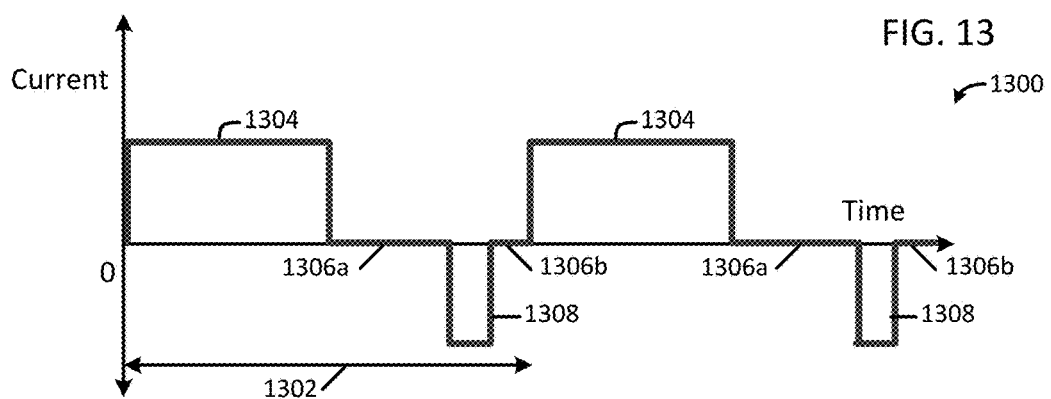

RAPID BATTERY CHARGING

CROSS REFERENCE TO RELATED APPLICATIONS

This application claims benefit from U.S. Patent Application U.S. Ser. No. 62/103,054, filed on Jan. 13, 2015, entitled "Rapid Battery Charging" and to U.S. Patent Application Nos. 62/102,497, filed Jan. 12, 2015 entitled "Rapid Battery Charging", and is related to U.S. Ser. No. 13/869,986 entitled "Method for Simultaneously Charging Multiple Batteries" filed on Apr. 25, 2013, and 61/637,868 entitled "Method for Simultaneously Charging Multiple Batteries" filed on Apr. 25, 2012, the entire contents of which are hereby incorporated by reference in their entirety.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

FIELD OF THE INVENTION

This disclosure relates in general to battery charging systems.

BACKGROUND ART

Users of battery chargers can benefit from the ability to charge more than one battery simultaneously without dividing the size of the current among the batteries. Examples of existing charging methods are described in U.S. Pat. Nos. 6,094,033 and 6,229,285, the entire contents of which are hereby incorporated by reference in their entirety.

Batteries have three intrinsic limitations during a charging cycle: maximum battery voltage, maximum battery temperature, and maximum allowable charging current. Exceeding any parameter can cause undercharging, overcharging, overheating or physical degradation, resulting in severely reduced battery life.

One method to rapidly charge a battery involves a discharge pulse from the battery being charged. This discharge could range from 2% to 10% of the charging pulse current amplitude. In large battery systems, the energy dissipated in this discharge pulse can be prohibitive to a practical battery charger for commercial and industrial use.

For example, for a 10 kW battery system, 10% of the energy would be dissipated. The resulting 1 KW would increase the cost of operating the charger by 10%. Moreover, the charger would require high power resistors, fans, heat sinks and other material in order to cool the product which would significantly increase the cost and size.

BRIEF SUMMARY OF THE INVENTION

As illustrated and described herein, the present invention provides efficient and faster charging of a wide range of batteries, from consumer electronics to vehicles, by reducing heat generating charge acceptance problems. In general, the present invention uses the discharge pulse of the battery to implement rapid charging in a way that will not generate an excessive amount of heat, thereby eliminating all the above consequences, and not significantly increase the operating cost. More specifically, the present invention recycles energy taken from the battery during the discharge pulse and reuses it. Depending on the exact topology being used for a particular charging system, different methods are required.

Two design drivers for energy recycling circuitry are efficiency and complexity. If the power circuitry is not efficient, gains made by the recycling effort can be partially offset by the energy lost in the recovery circuitry. Excessive complexity could raise the cost of charging system to a point of reduced demand. These two factors could result in a much less attractive product to the market.

For example, one embodiment of the present invention provides a method for charging one or more batteries with a battery charger. The method provides one or more batteries electrically connected to the battery charger, a recovery/discharge circuit electrically connected to each battery, and one or more energy storage devices electrically connected to each of the recovery/discharge circuits. The battery charger includes a pulse generator, a detector and a processor communicably coupled to the pulse generator and the detector. A charging pulse group is determined based on one or more battery parameters using the processor and the detector. The charging pulse group comprises a positive pulse, a rest period and a negative pulse. A charging pulse group is generated using the pulse generator. The charging pulse group is sequentially applied to each of the one or more batteries, an energy is recovered from each of the one or more batteries using the recovery/discharge circuits during the negative pulse, and the energy is stored in the one or more energy storage devices. The one or more parameters of the one or more batteries are monitored and a determination is made whether to adjust the charging pulse group for the one or more batteries using the processor and the detector.

Another embodiment of the present invention provides a method for charging one or more batteries with a battery charger. The method provides one or more batteries electrically connected to the battery charger, a recovery/discharge circuit electrically connected to each battery, and one or more energy storage devices electrically connected to each of the recovery/discharge circuits. The battery charger includes a pulse generator, a detector and a processor communicably coupled to the pulse generator and the detector. One or more parameters of the one or more batteries are measured. The one or more battery parameters may include at least one of a parallel resistance, a series resistance, a parallel capacitance, a phase angle, a battery temperature, a battery internal pressure, a battery internal resistance, a battery terminal voltage and a voltage derivative with time. A charging pulse group is determined based on one or more battery parameters using the processor and the detector. The charging pulse group comprises a positive pulse, a rest period and a negative pulse. A charging pulse group is generated using the pulse generator. The charging pulse group is sequentially applied to each of the one or more batteries, an energy is recovered from each of the one or more batteries using the recovery/discharge circuits during the negative pulse, and the energy is stored in the one or more energy storage devices. The one or more parameters of the one or more batteries are monitored. The charging pulse group is adjusted whenever the processor determines that an adjustment is required by changing at least one of a voltage, a current, the charging series time period, the charging time period, the rest time period, the positive pulse and the rest period. The generating step, the sequentially applying step, the monitoring step and the adjusting step are repeated until the one or more batteries are substantially charged, a specified charge level is obtained, or a specified charging time period has elapsed.

Yet another embodiment of the present invention provides a battery charging system for one or more batteries that includes a battery charger, a recovery/discharge circuit and one or more energy storage devices. The battery charger includes a pulse generator, a detector and a processor communicably coupled to the pulse generator and the detector. The pulse generator is configured to generate a charging pulse group that includes a positive pulse, a rest period and a negative pulse and sequentially applies the charging pulse group to each of the one or more batteries. The detector is configured to monitor one or more parameters of the one or more batteries. The processor is configured to determine the charging pulse group and determine whether to adjust the charging pulse group for the one or more batteries. A recovery/discharge circuit is electrically connected to each battery and is configured to recover energy from each of the one or more batteries during the negative pulse. One or more energy storage devices are electrically connected to each of the recovery/discharge circuits and are configured to store the energy recovered by the recovery/discharge circuits. Note that the recovery/discharge circuit and one or more energy storage devices can be integrated into the battery charger.

Another embodiment of the present invention provides a method for charging one or more cells within a battery with a battery charger by providing the battery having one or more cells electrically connected to the battery charger (including a pulse generator, a detector and a processor communicably coupled to the pulse generator and the detector), a recovery/discharge circuit electrically connected to each cell, and one or more energy storage devices electrically connected to each of the recovery/discharge circuits, determining a charging pulse group (including a positive pulse, a rest period and a negative pulse) based on one or more cell parameters using the processor and the detector, generating the charging pulse group using the pulse generator, sequentially applying the charging pulse group to each of the one or more cells, recovering an energy from each of the one or more cells using the recovery/discharge circuits during the negative pulse, and storing the energy in the one or more energy storage devices, and monitoring the one or more parameters of the one or more cells and determining whether to adjust the charging pulse group for the one or more cells using the processor and the detector.

Yet another embodiment of the present invention provides a battery charging system for one or more cells within a battery that includes a battery charger, a recovery/discharge circuit electrically connected to each cell, and one or more energy storage devices electrically connected to each of the recovery/discharge circuits. The battery charter includes a pulse generator configured to generate a charging pulse group (including a positive pulse, a rest period and a negative pulse) and sequentially applying the charging pulse group to each of the one or more cells, a detector configured to monitor one or more parameters of the one or more cells, and a processor communicably coupled to the pulse generator and the detector. The is processor configured to determine the charging pulse group and determine whether to adjust the charging pulse group for the one or more cells. Each recovery/discharge circuit is configured to recover an energy from each cell during the negative pulse. Each energy storage device is configured to store the energy recovered from the recovery/discharge circuits.

Technical advantages of certain embodiments will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE SEVERAL VIEWS OF THE DRAWINGS

For a more complete understanding of the present disclosure and its advantages, reference is now made to the following description, taken in conjunction with the accompanying drawings, in which:

FIG. 11 is a diagram illustrating the operation and waveforms of a battery charger in accordance with another embodiment of the present invention;

FIG. 12 is a diagram showing a charging/discharging waveform in accordance with another embodiment of the present invention;

FIG. 13 is a diagram showing a charging/discharging waveform in accordance with another embodiment of the present invention;

DETAILED DESCRIPTION OF THE INVENTION

As illustrated and described herein, the present invention provides efficient and faster charging of a wide range of batteries or cells within a battery, from consumer electronics to vehicles, by reducing heat generating charge acceptance problems. In general, the present invention uses the discharge pulse of the battery to implement rapid charging in a way that will not generate an excessive amount of heat, thereby eliminating all the above consequences, and not significantly increase the operating cost. More specifically, the present invention recycles energy taken from the battery during the discharge pulse and reuses it. Depending on the exact topology being used for a particular charging system, different methods are required. Note that the following disclosure provides various examples of the present invention and is not intended to limit the scope and applicability of the present invention.

Two design drivers for energy recycling circuitry are efficiency and complexity. If the power circuitry is not efficient, gains made by the recycling effort can be partially offset by the energy lost in the recovery circuitry. Excessive complexity could raise the cost of charging system to a point of reduced demand. These two factors could result in a much less attractive product to the market.

With electrochemical polarization, there are more ions at one electrode than the other. One embodiment of the present invention provides opportunities for the ions to disperse evenly on an ongoing basis during the charge. With concentration polarization, the electrolyte has a higher concentration at one electrode than the other. One embodiment of the present invention forces the concentration to move alternately from one electrode to the other throughout the charge, dramatically reducing polarization. Key battery parameters are continually monitored during the charging process, and from that feedback, the parameters of the algorithm are adjusted on an ongoing basis.

Figure 1:
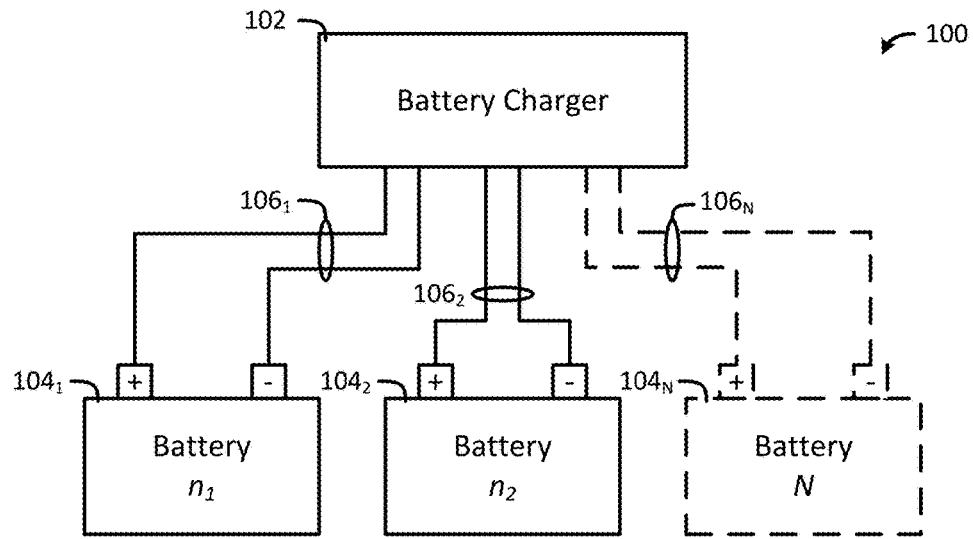
FIG. 1 is a block diagram of a charging system in accordance with one embodiment of the present invention.

Now referring to FIG. 1, a charging system 100 in accordance with one embodiment of the present invention is shown. The battery charger 102 is electrically connected to a number of batteries (N) where N>=2, represented by battery $n_1$, battery $n_2$ and battery N. The batteries $104_1$, $104_2$ and $104_N$ can be electrically connected to the battery charger 102 by any suitable means $106_1$, $106_2$ and $106_N$, such as wires, leads, plugs, etc. The battery charger 102 will be described in more detail below.

One embodiment of the present invention provides that when the charge period uses less than half of the time used by the full series of actions, the full power of the charging algorithm can be applied to more than one battery by applying the charge to one battery while the other actions are applied to another battery while continually alternating the charge and other actions between the batteries.

Figure 2:
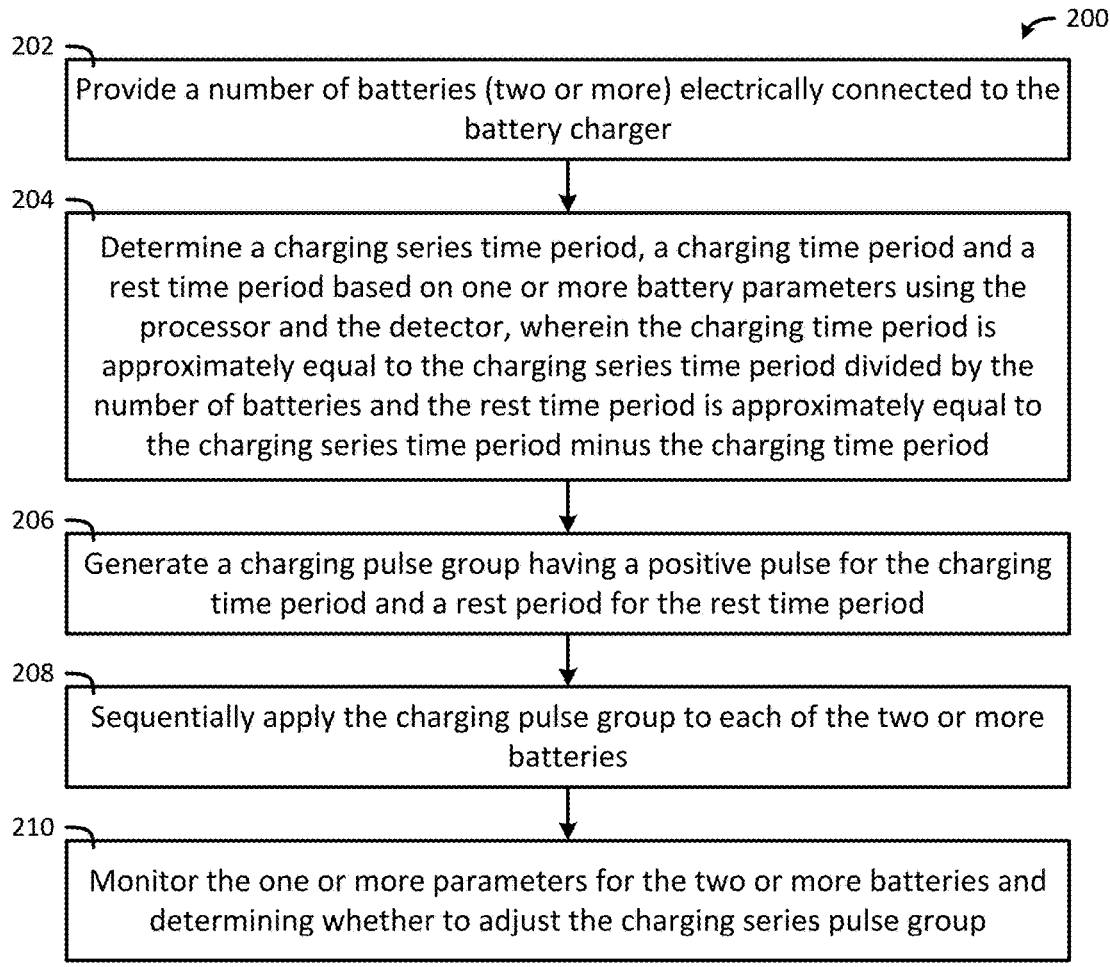
FIG. 2 is a flow chart of a method for charging two or more batteries with a battery charger in accordance with one embodiment of the present invention.

Referring now to FIG. 2, a method 200 for charging two or more batteries with a battery charger is shown. A number of batteries electrically connected to the battery charger are provided in block 202. The number of batteries is equal to or greater than two. The battery charger includes a pulse generator, a detector and a processor communicably coupled to the pulse generator and the detector (See e.g., FIG. 8). A charging series time period, a charging time period and a rest time period are determined based on one or more battery parameters using the processor and the detector in block 204. The one or more battery parameters may include at least one of a parallel resistance, a series resistance, a parallel capacitance, a phase angle, a battery temperature, a battery internal pressure, a battery internal resistance, a battery terminal voltage and a voltage derivative with time. The charging time period is approximately equal to the charging series time period divided by the number of batteries and the rest time period is approximately equal to the charging series time period minus the charging time period. A charging pulse group having a positive pulse for the charging time period and a rest period for the rest time period is generated using the pulse generator in block 206. The charging pulse group is sequentially applied to each of the two or more batteries in block 208. The one or more parameters of the two or more batteries are monitored followed by a determination of whether to adjust the charging pulse group in block 210 using the processor and the detector. The adjustments to the charging pulse group may include changing at least one of a voltage, a current, the charging series time period, the charging time period, the rest time period, the positive pulse, the rest period, or other parameters. Note that the adjustments can be performed on each battery such that the charging pulse group includes a first charging pulse group for a first battery and a second charging pulse group for a second battery. The generating step 206, sequentially applying step 208, monitoring step 210 and the adjusting step are typically repeated until the two or more batteries are substantially charged, a specified charge level is obtained, or a specified charging time period has elapsed.

The step of providing the number of batteries electrically connected to the battery charger (step 202) may include the step of electrically connecting the two or more batteries to the battery charger. The method 200 may also include the steps of generating a discharge pulse using the pulse generator, applying the discharge pulse to each of the two or more batteries, and detecting the one or more battery parameters using the detector. Moreover, the method 200 may include the step of measuring the one or more parameters of the two or more batteries. As will be described below, the step of generating the charging pulse group may further include a negative or discharge pulse during the rest time period.

Figure 3:
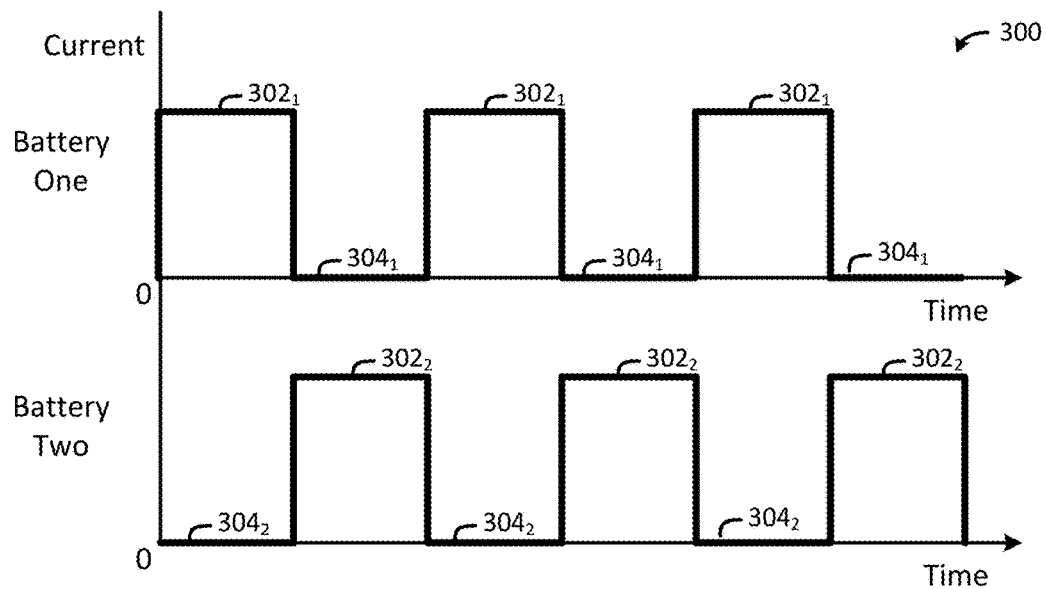
FIG. 3 is a diagram showing a charging pulse group for two batteries in accordance with one embodiment of the present invention.

Now referring to FIG. 3, one example of a charging pulse group 300 for two batteries is shown. The implementation follows a regularly repeated series of a charge pulse for 0.5 seconds ($302_1$ for battery one and $302_2$ for battery two) and a rest period for 0.5 seconds ($304_1$ for battery one and $304_2$ for battery two). In this case the method is able to deliver the full charge normally provided by this pulsed charge to two batteries simultaneously as shown below using the first three seconds of charge as an example:

| Elapsed Time | Battery 1 | | Battery 2 | |
|---|---|---|---|---|
| (seconds) | Charge Pulse | Rest Period | Charge Period | Rest Period |
| 0.5 | 0.5 sec. | | | |
| 1.0 | | 0.5 sec. | 0.5 sec. | |

-continued

| Elapsed Time | Battery 1 | | Battery 2 | |
| --- | --- | --- | --- | --- |
| (seconds) | Charge Pulse | Rest Period | Charge Period | Rest Period |
| 1.5 | 0.5 sec. | | | 0.5 sec. |
| 2.0 | | 0.5 sec. | 0.5 sec. | |
| 2.5 | 0.5 sec. | | | 0.5 sec. |
| 3.0 | | 0.5 sec. | 0.5 sec. | |

Note that the 0.5 and 1.0 second time periods are merely examples and are not intended to limit the scope of the invention. Any suitable time period can be used based on the parameters of the batteries and the battery charger.

If the charging algorithm included a shorter charge pulse that is not more than one third of the length of the series, the method would enable the simultaneous full charge of three batteries. The possible number of batteries simultaneously charged is rounded down whole number resulting from the time length of the series of actions divided by the time length of the charge pulse.

Figure 4:
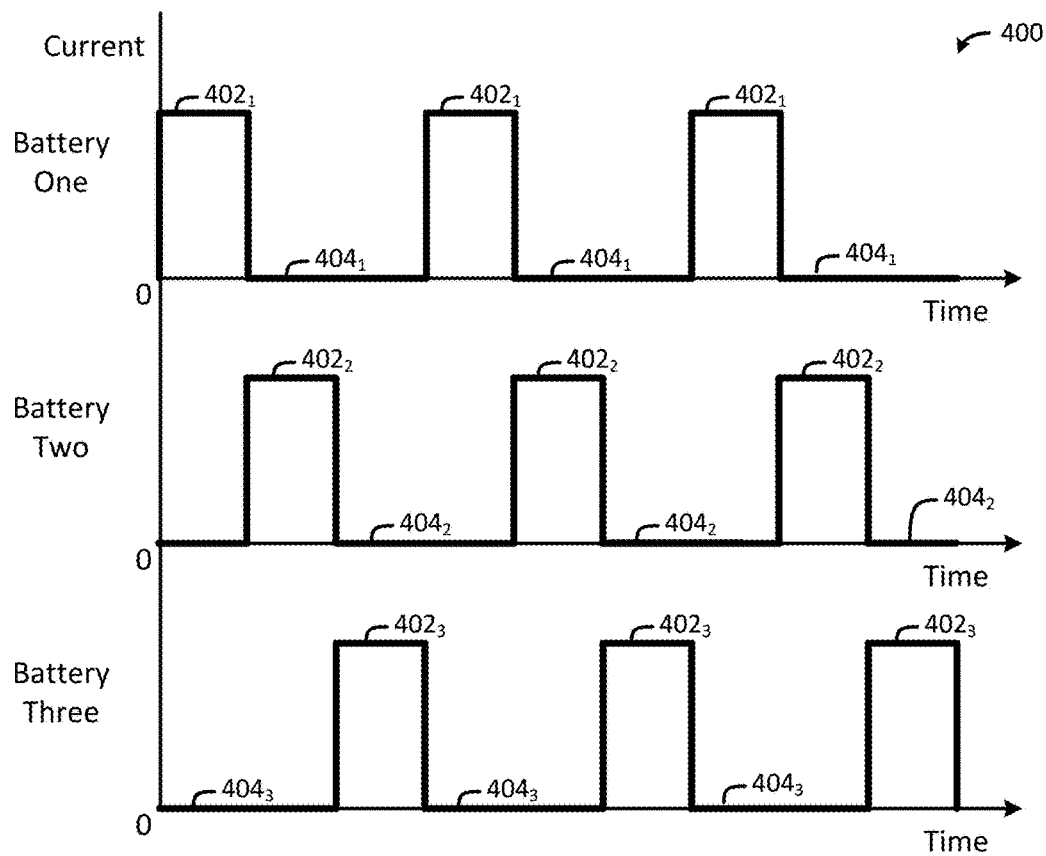
FIG. 4 is a diagram showing a charging pulse group for three batteries in accordance with one embodiment of the present invention and FIG. 5 is a diagram showing a charging pulse group for two batteries in accordance with another embodiment of the present invention.

Referring now to FIG. 4, one example of a charging pulse group 400 for three batteries is shown. The implementation follows a regularly repeated series of a charge pulse for 0.33 (⅓) seconds ($402_1$ for battery one, and $402_2$ for battery two and $402_3$ for battery three) and a rest period for 0.67 (⅔) seconds ($404_1$ for battery one, $404_2$ for battery two, and $404_3$ for battery three). In this case, the method is able to deliver the full charge normally provided by this pulsed charge to three batteries simultaneously as shown below using the first three seconds of charge as an example. For example, using the same elapsed time:

| Elapsed Time (seconds) | Battery 1 | | Battery 2 | | Battery 3 | |
| --- | --- | --- | --- | --- | --- | --- |
| | Charge Pulse | Rest Period | Charge Period | Rest Period | Charge Period | Rest Period |
| 0.33 | 0.33 sec. | | | | | |
| 0.67 | | 0.33 sec. | 0.33 sec. | | | |
| 1.00 | | 0.33 sec. | | 0.33 sec. | 0.33 sec. | |
| 1.33 | 0.33 sec. | | | 0.33 sec. | | 0.33 sec. |
| 1.67 | | 0.33 sec. | 0.33 sec. | | | 0.33 sec. |
| 2.00 | | 0.33 sec. | | 0.33 sec. | 0.33 sec. | |
| 2.33 | 0.33 sec. | | | 0.33 sec. | | 0.33 sec. |
| 2.67 | | 0.33 sec. | 0.33 sec. | | | 0.33 sec. |
| 3.00 | | 0.33 sec. | | 0.33 sec. | 0.33 sec. | |

Note that the 0.33 (⅓), 0.67 (⅔) and 1.0 second time periods are merely examples and are not intended to limit the scope of the invention. Any suitable time period can be used based on the parameters of the batteries and the battery charger.

Figure 5:
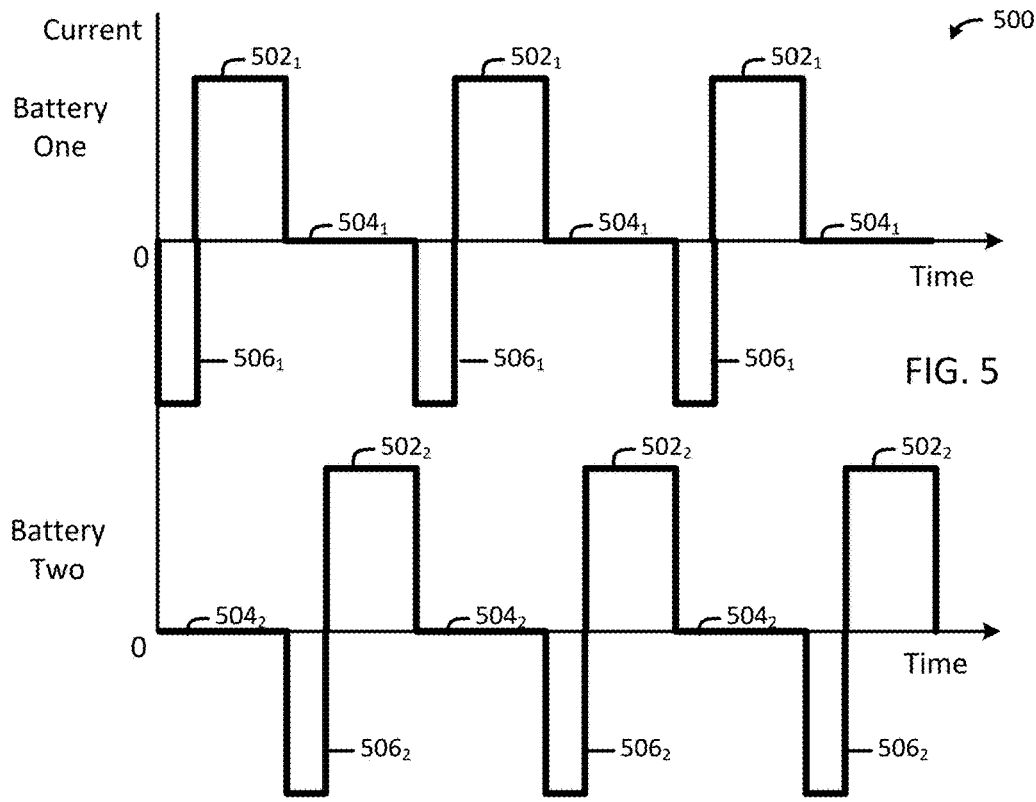

Now referring to FIG. 5, another example of a charging pulse group 500 for two batteries is shown. The implementation follows a regularly repeated series of a discharge or negative pulse ($506_1$ for battery one and $506_2$ for battery two), a charge pulse ($502_1$ for battery one and $502_2$ for battery two) and a rest period ($504_1$ for battery one and $504_2$ for battery two). In this example, the discharge or negative pulse 506 immediately precedes the charge pulse 504. Note also that the time periods and pulse magnitudes shown are merely examples and are not intended to limit the scope of the invention. For example, the magnitude of the discharge or negative pulse 506 may be less than the magnitude of the charge pulse 502. Any suitable time period and pulse magnitude can be used based on the parameters of the batteries and the battery charger.

Figure 6:
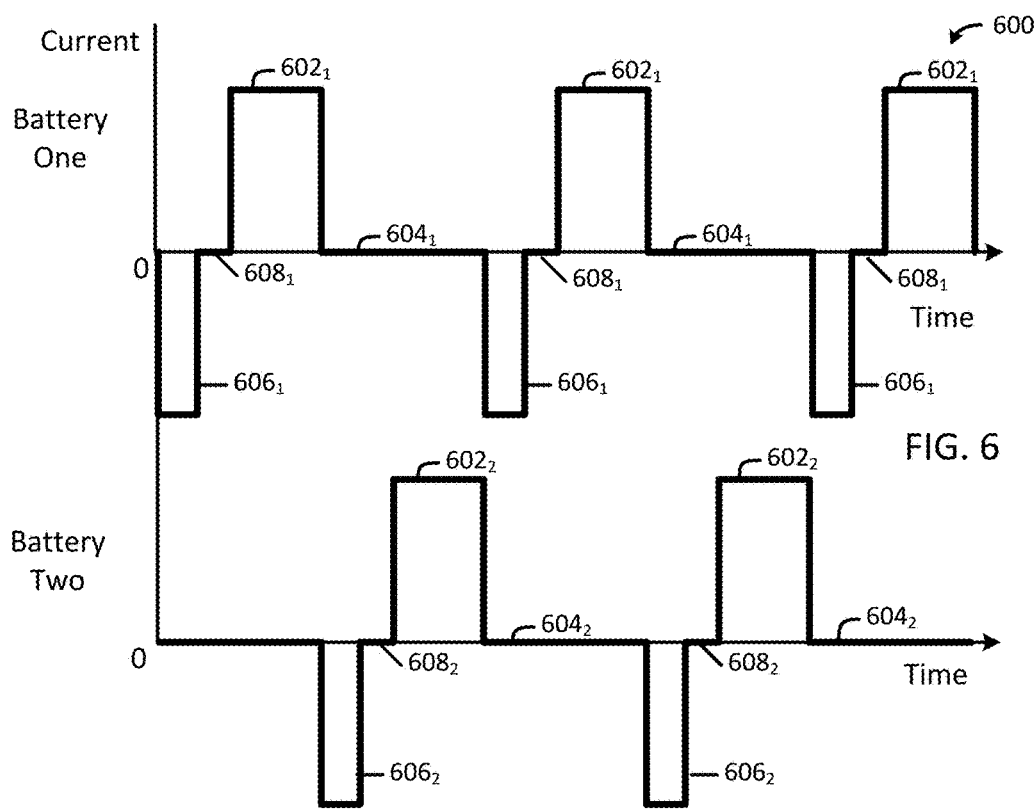
FIG. 6 is a diagram showing a charging pulse group for two batteries in accordance with another embodiment of the present invention.

Referring now to FIG. 6, yet another example of a charging pulse group 600 for two batteries is shown. The implementation follows a regularly repeated series of a discharge pulse ($606_1$ for battery one and $606_2$ for battery two), a charge pulse ($602_1$ for battery one and $602_2$ for battery two) and a rest period that has two portions, a first portion ($604_1$ for battery one and $604_2$ for battery two) that immediately follows the charge pulse 602 and a second portion ($608_1$ for battery one and $608_2$ for battery two) that immediately precedes the charge pulse 602. In this example, the discharge pulse 606 does not immediately follow the charge pulse 602 and does not immediately precede the charge pulse 602. Note also that the time periods and pulse magnitudes shown are merely examples and are not intended to limit the scope of the invention. For example, the magnitude of the discharge or negative pulse 606 may be less than the magnitude of the charge pulse 602. Any suitable time period and pulse magnitude can be used based on the parameters of the batteries and the battery charger.

Figure 7:
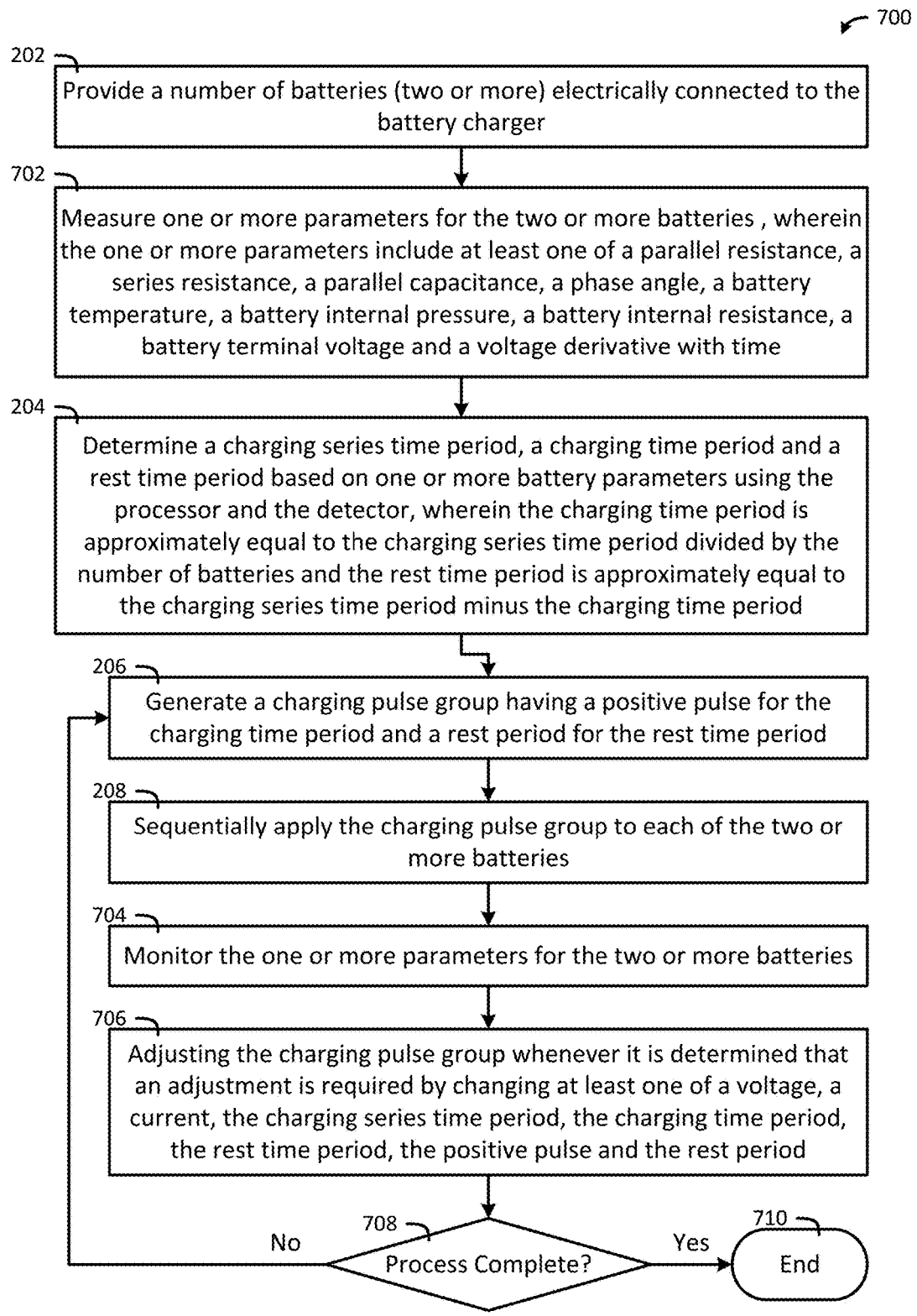
FIG. 7 is a flow chart of a method for charging two or more batteries with a battery charger in accordance with another embodiment of the present invention.

Now referring to FIG. 7, a method 700 for charging two or more batteries with a battery charger is shown. A number of batteries electrically connected to the battery charger are provided in block 202. The number of batteries is equal to or greater than two. The battery charger includes a pulse generator, a detector and a processor communicably coupled to the pulse generator and the detector (See e.g., FIG. 8). One or more parameters of the two or more batteries are measured in block 702. The one or more battery parameters may include at least one of a parallel resistance, a series resistance, a parallel capacitance, a phase angle, a battery temperature, a battery internal pressure, a battery internal resistance, a battery terminal voltage and a voltage derivative with time. A charging series time period, a charging time period and a rest time period are determined based on one or more battery parameters using the processor and the detector in block 204. The charging time period is approximately equal to the charging series time period divided by the number of batteries and the rest time period is approximately equal to the charging series time period minus the charging time period. A charging pulse group having a positive pulse for the charging time period and a rest period for the rest time period is generated using the pulse generator in block 206. The charging pulse group is sequentially applied to each of the two or more batteries in block 208. The one or more parameters of the two or more batteries are monitored using the detector in block 704. The charging pulse group is adjusted in block 706 whenever it is determined that an adjustment is required using the processor. The adjustments to the charging pulse group may include changing at least one of a voltage, a current, the charging series time period, the charging time period, the rest time period, the positive pulse, the rest period, or other parameters. Note that the adjustments can be performed on each battery such that the charging pulse group includes a first charging pulse group for a first battery and a second charging pulse group for a second battery. If the process is complete, as determined in decision block 708, the process ends in block 710. The process may be complete when the two or more batteries are substantially charged, a specified charge level is obtained, or a specified charging time period has elapsed. If, however, the process is not complete, as determined in decision block 708, the process loops back to block 206 and repeats as previously described.

The step of providing the number of batteries electrically connected to the battery charger (step 202) may include the step of electrically connecting the two or more batteries to the battery charger. The method 700 may also include the steps of generating a discharge pulse using the pulse generator, applying the discharge pulse to each of the two or more batteries, and detecting the one or more battery parameters using the detector. As previously described, the step of generating the charging pulse group may further include a negative or discharge pulse during the rest time period.

Figure 8:
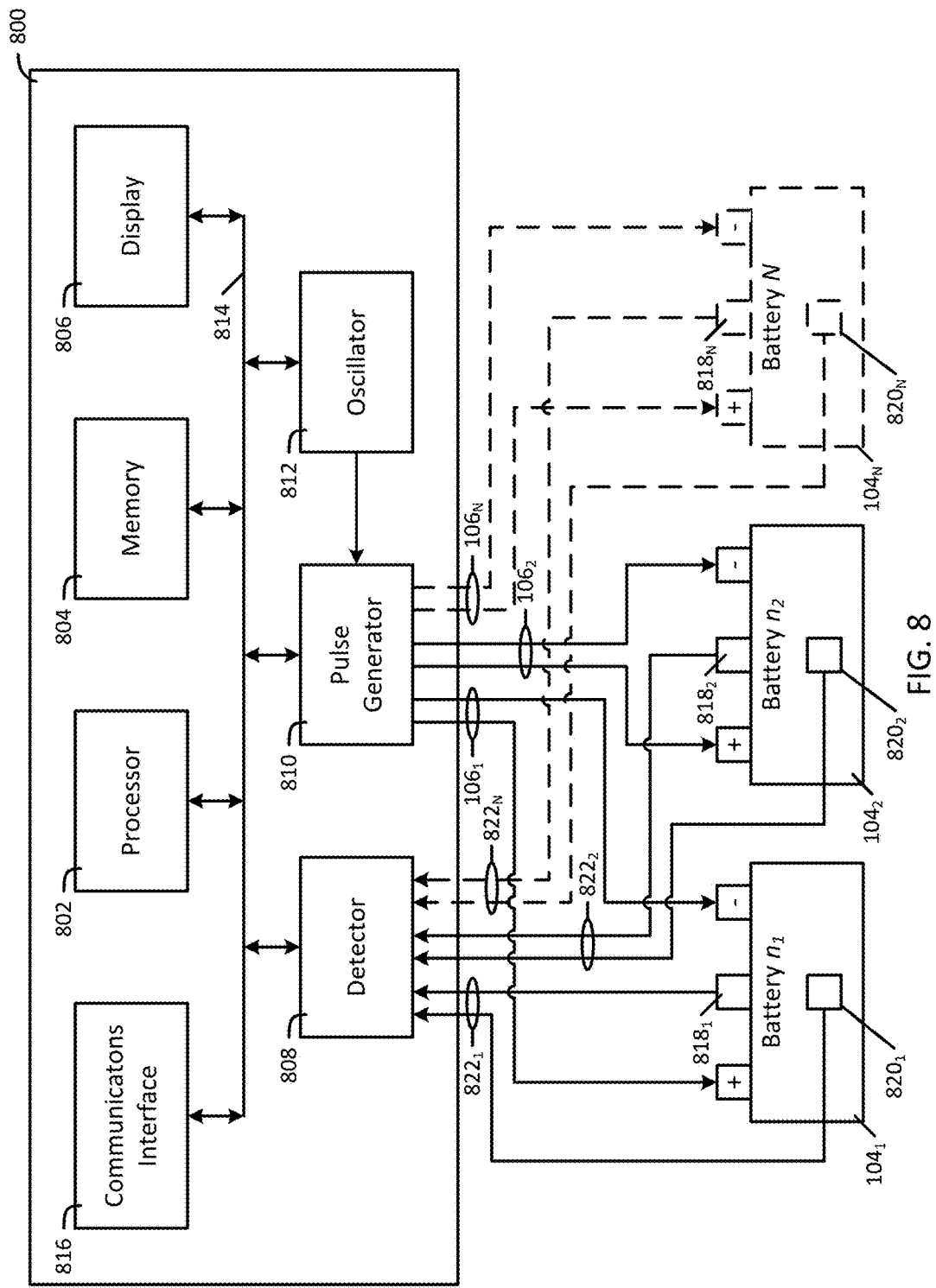
FIG. 8 is a block diagram of a charging system in accordance with another embodiment of the present invention.

Referring now to FIG. 8, a block diagram of a battery charger 800 in accordance with one embodiment of the present invention is shown. The battery charger 800 includes a processor 802, a memory 804, a display 806, a detector 808, a pulse generator 810 and an oscillator 812 communicably coupled to one another by one or more communication buses 814. Note that the oscillator 812 may be part of or integrated into the pulse generator 810. The battery charger 800 may include a communications interface 816 (wired, wireless, optical, etc.) that can be used to communicably couple the battery charger 800 to other local or remote devices or systems. The battery charger 800 is electrically connected to a number of batteries (N) where N>=2, represented by battery $n_1$, battery $n_2$ and battery N. The batteries $104_1$, $104_2$ and $104_N$ can be electrically connected to the pulse generator 810 by any suitable means $106_1$, $106_2$ and $106_N$, such as wires, leads, plugs, etc. Likewise one or more sensors (e.g., temperature sensor $818_1$, $818_2$ and $818_N$, pressure sensor $820_1$, $820_2$ and $820_N$, etc.) associated with the batteries $104_1$, $104_2$ and $104_N$ can be electrically connected to the detector 808 by any suitable means $822_1$, $822_2$ and $822_N$, such as wires, leads, plugs, etc. The battery charger 800 is configured to preform one or more of the methods described above in reference to FIGS. 2 and 7.

For example, the pulse generator 810 is configured to generate a charging pulse group having a positive pulse for a charging time period and a rest period for a rest time period and sequentially apply the charging pulse group to each of the two or more batteries $104_1$, $104_2$ and $104_N$. The detector 808 is configured to monitor one or more parameters of the two or more batteries $104_1$, $104_2$ and $104_N$. The processor 802 is configured to determine the charging series time period, the charging time period and the rest time period based on the one or more battery parameters, wherein the charging time period is approximately equal to the charging series time period divided by a number of batteries (N) comprising the two or more batteries and the rest time period is approximately equal to the charging series time period minus the charging time period. The processor 802 is further configured to determine whether to adjust the charging pulse group for the two or more batteries $104_1$, $104_2$ and $104_N$. As previously described, the step of generating the charging pulse group may further include a negative or discharge pulse during the rest time period.

The detector 808 can be further configured to measure the one or more parameters of the two or more batteries $104_1$, $104_2$ and $104_N$. The one or more battery parameters may include at least one of a parallel resistance, a series resistance, a parallel capacitance, a phase angle, a battery temperature, a battery internal pressure, a battery internal resistance, a battery terminal voltage and a voltage derivative with time. The processor 802 can be further configured to adjust the charging pulse group for the two or more batteries $104_1$, $104_2$ and $104_N$ by changing at least one of a voltage, a current, the charging series time period, the charging time period, the rest time period, the positive pulse and the rest period. The charging pulse can be adjusted for each battery such that the charging pulse group comprises a first charging pulse group for a first battery and a second charging pulse group for a second battery. The processor 802 can be further configured to charge the two or more batteries $104_1$, $104_2$ and $104_N$ until the two or more batteries are substantially charged, a specified charge level is obtained, or a specified charging time period has elapsed.

The state of the art for charging batteries already includes the electronic components necessary to switch the charge pulse and other actions between the batteries that are simultaneously charged, without a significant increase in the cost of the charger, enabling one charger to provide the full performance of two or more chargers for virtually the same price as one charger. For example, the battery charger in accordance with the present invention may include any of the features and processes described in U.S. Pat. Nos. 6,094,033 and 6,229,285, the entire contents of which are hereby incorporated by reference in their entirety.

The maximum output of a first prototype was 16.6 kilowatts variable from 0 to 830 amps and 0 to 20 volts to test charging of batteries for small portable devices and for small vehicles. The maximum output of our second prototype is 102.4 kilowatts. The transformer has two taps, providing outputs of 0 to 1280 amps and 0 to 512 volts for passenger vehicles whose lithium ion battery packs have hundreds of volts, and providing outputs of 0 to 200 amps and 0 to 80 volts for industrial vehicles whose lead acid batteries and packs have dozens of volts. The second prototype has been pilot tested at commercial locations.

Below are the combined test results, which were achieved even before the automated battery monitoring aspects of the patent are implemented:

| Test | Battery | Chemistry | Application |
|---|---|---|---|
| 1 | Thundersky 3.2 V, 60 Ah | Lithium Iron Phosphate | Cars & Devices, such as Power Tools, etc. |
| 2 | Panasonic 18650 3.6 V, 3.1 Ah | Lithium Cobalt Oxide | Cell Phones, Laptops and Tesla Cars |
| 3 | Trojan 24TMX 12 V, 85 Ah | Flooded Lead Acid | Small Electric Vehicles |
| 4 | Trojan T-105 6 V, 225 Ah | Flooded Lead Acid | Electric Vehicles |
| 5 | Exide GNB 48 v, 700 Ah | Flooded Lead Acid | Forklift Trucks |

| Test | Charge Range | Time | Temp | Mfg Max Safe Temp | Normal Times for Slow and Fast Charges |
|---|---|---|---|---|---|
| 1 | 20 to 80% 20 to 100% | 12 min 16 min | 42° C. 46° C. | 85° C. | Slow: 3 hrs Fast: 30 to 60 min |

-continued

| Test | Charge Range | Time | Temp | Mfg Max Safe Temp | Normal Times for Slow and Fast Charges |
|---|---|---|---|---|---|
|  | 0 to 100% | 19 min | 46° C. |  | (20 to 80%) |
| 2 | 20 to 80% | 20 min | 42° C. | 50° C. | Slow: 3 hrs |
|  | 20 to 100% | 28 min | 47° C. |  | Fast: 40 to 60 min |
|  |  |  |  |  | (20 to 80%) |
| 3 | 20 to 100% | 31 min | 49° C. | 49° C. | Slow: 8 hrs |
| 4 | 20 to 100% | 68 min | 44° C. | 49° C. | Fast: 2 to 3.5 hrs |
| 5 | 20 to 80% | 90 min | 48° C. | 60° C. |  |
|  | 20 to 100% | 2 hrs | 55° C. |  |  |

Other predetermined battery parameters, such equivalent circuit capacitance and resistance, electrochemical overcharge, maximum battery temperature, and maximum battery internal pressure, among others, can be compared with monitored values during the battery charging process to control the charging signal in order to continually altering the charge algorithm as the charge proceeds.

Just as two or more batteries can be charged simultaneously as described above, two or more cells within a battery that has a battery management system (BMS) can also be charged simultaneously. For example, half of the cells could receive a charge pulse while the other half are in a rest period or sending a discharge pulse. The advantage is that the amp hours required to charge the battery would be about half of what would otherwise be required, thereby reducing the cost of the charger, especially for large batteries. As a result, all of the foregoing examples of methods and systems are applicable to charging two or more cells within a battery by changing the term "battery" to "battery cell".

Accordingly, the present invention also provides a method for charging one or more cells within a battery with a battery charger by providing the battery having one or more cells electrically connected to the battery charger (including a pulse generator, a detector and a processor communicably coupled to the pulse generator and the detector), a recovery/discharge circuit electrically connected to each cell, and one or more energy storage devices electrically connected to each of the recovery/discharge circuits, determining a charging pulse group (including a positive pulse, a rest period and a negative pulse) based on one or more cell parameters using the processor and the detector, generating the charging pulse group using the pulse generator, sequentially applying the charging pulse group to each of the one or more cells, recovering an energy from each of the one or more cells using the recovery/discharge circuits during the negative pulse, and storing the energy in the one or more energy storage devices, and monitoring the one or more parameters of the one or more cells and determining whether to adjust the charging pulse group for the one or more cells using the processor and the detector.

In addition, the present invention provides a battery charging system for one or more cells within a battery that includes a battery charger, a recovery/discharge circuit electrically connected to each cell, and one or more energy storage devices electrically connected to each of the recovery/discharge circuits. The battery charter includes a pulse generator configured to generate a charging pulse group (including a positive pulse, a rest period and a negative pulse) and sequentially applying the charging pulse group to each of the one or more cells, a detector configured to monitor one or more parameters of the one or more cells, and a processor communicably coupled to the pulse generator and the detector. The is processor configured to determine the charging pulse group and determine whether to adjust the charging pulse group for the one or more cells. Each recovery/discharge circuit is configured to recover an energy from each cell during the negative pulse. Each energy storage device is configured to store the energy recovered from the recovery/discharge circuits.

Various methods and configurations to recycle the energy taken from the discharge pulse will now be described. The charging process described in U.S. Pat. Nos. 6,094,033 and 6,229,285 describes a discharge pulse that is approximately 5-10% of the previous charge pulse. This represents a corresponding energy loss of 5-10%. Although this loss is negligible for low power chargers, it is not negligible for large industrial chargers. For example, the loss for a 10 watt charger would be approximately 0.5 to 1 watt. To recover this energy, the cost and resulting energy recovery probably would not provide a reasonable cost/benefit ratio. However, for a 10 KW charger the power loss would be approximately 1 KW (10%). With a reasonable charger power conversion efficiency of 85%, a 1500 watt power loss would occur. The additional 1 KW reverse pulse loss plus the efficiency loss equals 2500 watts. This results in almost twice the heat that must be rejected. Power consumption is almost doubled, larger fans and larger charger volume is required.

The present invention solves these problems by implementing an active solution using a circuit that will act as the reverse pulse (also referred to herein as negative pulse or discharge pulse) instead of passively dissipating the reverse energy. Ten percent (10%) of the previous charge pulse energy is transferred to a temporary storage point. The charger on the subsequent charging pulse uses this stored energy. The efficiency of the energy recovery circuit would be in the 80% to 90% range, which results in at least 80% of the 1 KW being recovered (200 watts lost). The resulting total heat loss is 1500 watts plus 200 watts equals 1700 watts. The total power savings is 2500 watts minus 1700 watts equals 800 watts. The design can take many forms dependent upon the input/output voltage combination. The primary design driver is defining the optimum point to store the reverse energy based on the power technology being used. As power levels are increased to the KW range, this circuit allows for a practical implementation of the algorithm.

Figure 9:
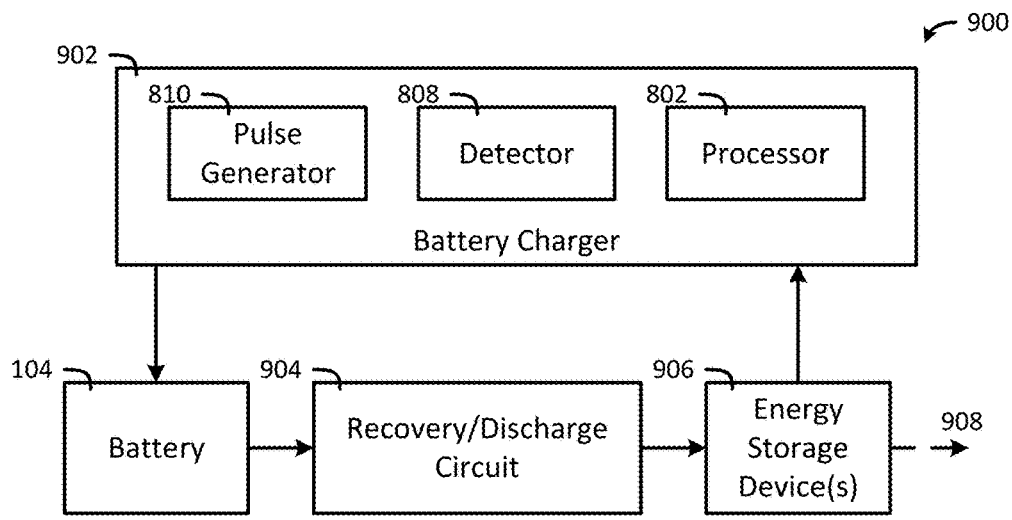
FIG. 9 is a block diagram of a battery charging system in accordance with another embodiment of the present invention.

Now referring to FIG. 9, a block diagram of a battery charging system 900 in accordance with another embodiment of the present invention is shown. The battery charging system 900 for one or more batteries 104 includes a battery charger 902, a recovery/discharge circuit 904 and one or more energy storage devices 906. The battery charger 902 includes a pulse generator 810, a detector 808 and a processor 802 communicably coupled to the pulse generator 810 and the detector 808. The battery charger 902 may include other components (e.g., see FIG. 8, etc.). The pulse generator 810 is configured to generate a charging pulse group that includes a positive pulse, a rest period and a negative pulse and sequentially apply the charging pulse group to each of the one or more batteries 104. The detector 808 is configured to monitor one or more parameters of the one or more batteries 104. The processor 802 is configured to determine the charging pulse group and determine whether to adjust the charging pulse group for the one or more batteries 104. A recovery/discharge circuit 904 is electrically connected to each battery 104 and is configured to recover energy from each of the one or more batteries 104 during the negative pulse. One or more energy storage devices 906 are electrically connected to each of the recovery/discharge circuits 904 and are configured to store the energy recovered by the recovery/discharge circuits 904. The stored energy can be provided back to the battery charger 902 or other devices/systems 908. Moreover, the recovery/discharge circuit 904 and/or energy storage devices 906 can be integrated into the battery charger 902.

A user interface provides a display and controls to provide user charge algorithm and battery type versatility and monitor key parameters graphically and numerically in real time, such as progress of charge, charge algorithm waveform variations, battery temperature/voltage/current, approximate state of charge, control loops outputs, warnings of excessive voltage or temperature, energy recovery, etc. Note that the charging algorithm can be customized for any given situation.

The charger is capable of charging batteries using a cyclical charge/discharge process, discharging batteries and monitoring their condition in an idle state. The user can specify how a particular battery is charged or discharged by adding additional models to the software. While running a test, the battery's current, voltage and temperature measurements are taken to monitor its condition. This information along with other test data is also sent to a .CSV file so the results of the test can be reviewed after the test. The charger can safely provide a 20% to 80% charge in 20 minutes without overheating or overcharging the battery. Many types of batteries can be charged, lithium ion 18650 cell to over 20,000 Ahr batteries, lead based chemistries (e.g., flooded, AGM, SLA, maintenance free, etc.), lithium cobalt oxide, lithium iron phosphate, etc.

Figure 10:
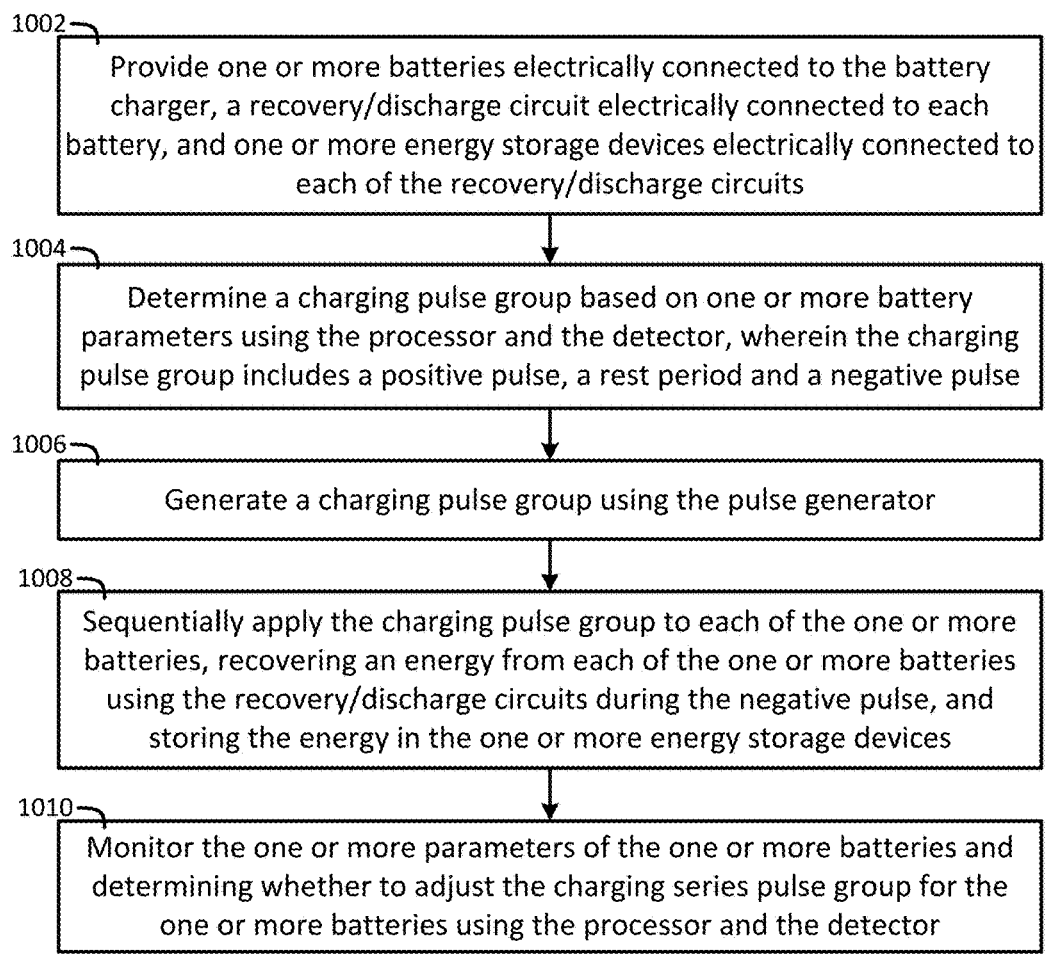
FIG. 10 is a flow chart of a method for charging one or more batteries with a battery charger in accordance with another embodiment of the present invention.

Referring now to FIG. 10, a flow chart of a method 1000 for charging one or more batteries with a battery charger in accordance with another embodiment of the present invention is shown. The method provides one or more batteries electrically connected to the battery charger, a recovery/discharge circuit electrically connected to each battery, and one or more energy storage devices electrically connected to each of the recovery/discharge circuits in block 1002. The battery charger includes a pulse generator, a detector and a processor communicably coupled to the pulse generator and the detector. A charging pulse group is determined based on one or more battery parameters using the processor and the detector in block 1004. The charging pulse group comprises a positive pulse, a rest period and a negative pulse. The negative pulse can immediately precede the positive pulse, or immediately follow the positive pulse, or be in between (does not immediately follow the positive pulse and does not immediately precede the positive pulse). A charging pulse group is generated using the pulse generator in block 1006. The charging pulse group is sequentially applied to each of the one or more batteries, an energy is recovered from each of the one or more batteries using the recovery/discharge circuits during the negative pulse, and the energy is stored in the one or more energy storage devices in block 1008. The one or more parameters of the one or more batteries are monitored and a determination is made whether to adjust the charging pulse group for the one or more batteries using the processor and the detector in block 1010. The one or more battery parameters may include at least one of a parallel resistance, a series resistance, a parallel capacitance, a phase angle, a battery temperature, a battery internal pressure, a battery internal resistance, a battery terminal voltage and a voltage derivative with time. The adjustments to the charging pulse group may include changing at least one of a voltage, a current, the charging series time period, the charging time period, the rest time period, the positive pulse, the rest period, or other parameters. Note that the adjustments can be performed on each battery. For example, if there are two batteries, the charging pulse group includes a first charging pulse group for a first battery and a second charging pulse group for a second battery. The generating step 1006, sequentially applying step 1008, monitoring step 1010 and the adjusting step are typically repeated until the two or more batteries are substantially charged, a specified charge level is obtained, or a specified charging time period has elapsed.

The step of providing the number of batteries electrically connected to the battery charger (step 1002) may include the step of electrically connecting the one or more batteries to the battery charger and the recovery/discharge circuit. The method 1000 may also include the steps of generating a discharge pulse using the pulse generator, applying the discharge pulse to each of the one or more batteries, and detecting the one or more battery parameters using the detector. Moreover, the method 1000 may include the step of measuring the one or more parameters of the one or more batteries. The one or more energy storage devices may include an AC storage device, a DC storage device, a tertiary storage device, or a combination thereof. The energy stored in the one or more energy storage devices can be used to recharge the one or more batteries.

Now referring to FIG. 11, a diagram illustrating the operation and waveforms of a battery charger in accordance with another embodiment of the present invention is shown. The battery charger can charge two large battery banks (Battery 1 and Battery 2) using a single charger. Each battery bank is independently regulated. Faster charging results in lower required battery pack capacity. Charge and discharge cycles occur alternately, which reduces charger cost and size. Moreover, the modular design of the battery charger provides redundancy and fault tolerance.

The battery charger has two ports, one for each battery pack. Battery pack 1 and battery pack 2 are alternately charged and discharged. The battery voltage curve is depicted in green ($1100_1$ for battery pack 1 and $1100_2$ for battery pack 2), the battery charging current is depicted in red ($1102_1$ for battery pack 1 and $1102_2$ for battery pack 2), and the battery discharge current is depicted in purple ($1104_1$ for battery pack 1 and $1104_2$ for battery pack 2). A positive voltage slope (voltage increases) is generated during charge. A negative slope (voltage decreases) is generated during discharge. The flat area is the rest period of the charging cycle. The positive charging current amplitude can be three to four times the magnitude of a conventional charger.

The charging pulse group is sequentially applied as represented by the yellow and blue shaded areas and energy flow diagrams 1106, 1108, 1110 and 1112. In the yellow shaded area and energy flow diagram 1106, the battery charger recovers battery discharge current $1104_1$ from battery pack 1 via port 1 while applying battery charging current $1102_2$ to battery pack 2 via port 2. In the blue shaded area and energy flow diagram 1108, the battery charger continues applying battery charging current $1102_2$ to battery pack 2 via port 2. In the yellow shaded area and energy flow diagram 1110, the battery charger applies battery charging current $1102_1$ to battery pack 1 via port 1 while recovering battery discharge current $1104_2$ from battery pack 2 via port 2. In the blue shaded area and energy flow diagram 1112, the battery charger continues applying battery charging current $1102_2$ to battery pack 1 via port 1.

In one typical example, the charge current pulse 1102 has an amplitude $I_C$ and duration $t_C$. An initial charge current magnitude is approximately equal to three to four times the battery's amp hour rating. The discharge pulse 1104 has an amplitude $I_D$ and duration $t_D$. The magnitude of this reverse current is approximately equal to or greater than the magnitude of the positive charger current. The time $t_D$ is a small fraction (approximately 1% to 10%) of $t_C$. The battery current is zero during the rest time $t_R$. This parameter depends upon several factors and is empirically determined. During the entire charging process, battery temperature, rate of temperature change, battery voltage and current are continually monitored and modulated by the firmware. The parameters of the algorithm are adjusted in real time during the charge.

The industry standard charging current is based upon the amp hour (Ahr) rating of the battery and is denoted by C. For example, if each battery pack is 500 Ahr, then the standard charge rate would be in the range of C/3 to C/5 resulting in a charging current of 100 to 170 amps. There would be variations depending upon the characteristics of a particular battery. For this particular application, the charge current would be set to 2 C (1000 A) with a 50% duty cycle resulting in a charge rate of C or 500 amps. The discharge current would subtract from this slightly. The resulting charge time would be approximately 1.1 hours. This charge time is two to three times faster than what would be attainable using a conventional charger. With a conventional charger, the charge current would be limited to a maximum of C/3 or 170 amps.

The cost savings are significant since there is only one charger required for two battery packs. In addition, at least twice as many battery packs can be charged in the same time. In summary, the battery charger has four times the charge capacity of a conventional charger.

Note that other charging/discharging waveforms can be used. For example and now referring to FIG. 12, another charging/discharging waveform 1200 in accordance with another embodiment of the present invention is shown. The characteristics of the charging/discharging waveform 1200 are as follows:
  Length of Charge Pulse Group 1202: 10 ms
  Charge Pulse 1204: 8.5 ms
  Rest Period 1206: 0.7 ms
  Discharge Pulse 1208: 0.8 ms
  Current: >6 amps for 10 minutes, 3 to 7 amps for 10 to 20 minutes, varied from 3 to 10 amps depending on time and temperature, discharge pulse approximately 8 amps.

Note that the time periods and pulse magnitudes shown are merely examples and are not intended to limit the scope of the invention. Any suitable time period and pulse magnitude can be used based on the parameters of the batteries and the battery charger.

An example of the charging procedure is as follows:
1. Completely discharge batteries to 0%
2. Precharge for 3 hours at 200 mA for a total of 600 mAh
3. 20% of 3 amp hours equals 600 mAh, therefore the battery is no more than 20% precharged.
4. Apply charging algorithm for 20 minutes.
5. Following charge, apply 1.02 A constant discharge until OCV=3.3V
6. Continue discharge until battery voltage is 2.5V.
7. Calculate total amp hours discharged.

The charging procedure was tested on two batteries (Lithium Cobalt Oxide Panasonic NCR18650A Cell). The results of step 5 were 3.32V ocv occurred at 1 hour and 50 minutes, which equals 1.87 aH/1.87/3=62%. A continued discharge resulted in an additional 0.29 amp hours at a 2.5V cutoff. The total amp hours were 1.87 plus 0.29=2.16 Ah, 2.16/3=72%. The max voltage=4.3V, max temp=47 C, ambient=26 C. A full summary of the results are as follows:

| | Fast Charge | Panasonic Slow Charge |
|---|---|---|
| Battery Specification | | 3.6 v 3.1 ah |
| 20% to 80% Charge | 20 minutes | 120 minutes |
| Maximum Charge Rate | 2.3 C | 0.3 C |
| Average Charge Rate | 1.8 C | 0.3 C |
| Average Charge Temp | 42° C. | Not Provided |
| Final Charge Temp | 43° C. | Not Provided |
| Maximum Charge Temp | 45° C. | Not Provided |
| Panasonic Suggested Max | | 45° C. |
| Maximum Charge Voltage | 4.3 v | 4.2 v |
| Average Charge Voltage | 4.0 v | 3.9 v |
| Panasonic Suggested Max | | 4.35 v |
| State of Charge Coulomb Counting | Discharged 1.87 ah (=60.3% of 3.1 ah) to verify that cell received 60% additional charge from a 20% state of charge | |
| Cycle Life Expectation | Excessive voltage and temperature affect $LiCoO_2$ cycle life. The PDI fast charge does not exceed safe levels. Therefore, sufficient cycle life is expected. | |

In another example and now referring to FIG. 13, another charging/discharging waveform 1300 in accordance with another embodiment of the present invention is shown. The charger performs a series of charging cycles (charge pulse group 1302) which consist of charge pulse step 1304 for 0.5 seconds, idle delay step 1306a for 0.3 seconds, a discharge pulse step 1308 for 0.1 seconds, and a second delay step 1306b for 0.1 seconds before the beginning of the next series. Note that the time periods and pulse magnitudes shown are merely examples and are not intended to limit the scope of the invention. Any suitable time period and pulse magnitude can be used based on the parameters of the batteries and the battery charger.

At the end of each step, the charge/discharge current, voltage at the battery's terminals and the temperature at two locations on the battery's enclosure are taken. This is used to modify process to ensure the maximum amount of charge is delivered to the battery for a given time while maintaining a safe operating temperature for the battery. In this embodiment, the timing for the charge, idle and discharge step is not modified during the process, only the step's current amplitude. During the charge step 1302, the current level can be reduced if the battery's temperature exceeds a certain level or if the voltage at the battery leads goes above the maximum safe level. For the idle step 1306a, the voltage level is checked at the end of the idle step 1306a to see if the battery has reached its max voltage. The discharge step 1308 operates much like the charge step 1302, but in reverse using a smaller current over a shorter period of time. The full charge in Amp*hours is measured by integrating the charge and discharge current pulse. The charging cycles continue until one of the following conditions occurs: (1) the battery has received its full charge; (2) the maximum battery temperature has been reached; (3) the charge/discharge current level has been reduced to its low limit; or (4) if the max test time has elapsed.

Concerning discharging batteries, the tester discharges the battery at a constant current level. Again, the full discharge in Amp*hours is measured until the process is stopped. The stopping conditions are as follows: (1) the battery's voltage level has reached its low limit level; (2) the time allotted for discharging the battery has elapsed; or (3) the battery's temperature level has reached its max level.

The monitoring process was added to measure the battery's temperature and voltage level after a charge or discharge test. In some cases, the battery temperature continued to rise, so the user can now monitor its temperature after test.

The charging procedure was tested on a Lead Acid Yuasa NP7-12 6 Cell Sealed Battery. One complete cycle was one second. The rest time was 230 mS (1 s−0.7 s−0.07 s=0.23 seconds). The summary of the test of battery NP7-12 is:
1. The initial state of the battery was complete depletion.
2. Battery was precharged with 0.5 amps for 5 minutes to bring initial battery voltage to 11 volts
3. Initial pulse charge current: 20 amps, 3×C (C=amp hour capacity)/pulse duration=0.7 seconds, average charging current is 20*0.7=14 amps
4. Initial discharge current: 1 ohm load/approximately 12 amps/pulse duration=0.07 seconds, average discharge current is 12*0.07=0.84 amps. Net charging current equals 12.16 amps (14−0.84 amps)
5. Final pulse charge current: 5 amps/pulse duration=0.07 seconds
6. Final discharge current: 1.5 ohm load/approximately 12 amps
7. After this time, a conventional constant voltage charge was applied for 10 minutes at 14.5V. Initial current was 2 amps. The duration of the final charge (topoff) was 7 minutes and the termination current was 0.5 amps.
8. The total charge time was 58 minutes.
9. The capacity was measured with a 7 amp constant discharge and compared to the discharge curve in the spec. The battery storage exceeded the discharge curve and also by simple computation (discharge current multiplied by time) the battery was fully charged.
10. The algorithm used was the discharge followed by charge sequence. This seems to work better than discharge followed by charge sequence.
11. Maximum battery temperature was 43 C.
12. Maximum battery voltage during pulsing was 15.6V. This is the industry standard equalization voltage so no harmful effects will result.

A full summary of the results are as follows:

|  | Fast Charge | Yuasa Slow Charge |
| --- | --- | --- |
| Battery Specification |  | 12 v 7 ah |
| 20% to 80% Charge | 35 minutes | 4 hours |
| 20% to 100% Charge | 46 minutes | 9 hours |
| Maximum Charge Rate | 1.3 C | 0.20 C |
| Average Charge Rate | 1.3 C | 0.10 C |
| Average Charge Temp | 38° C. | Not Provided |
| Final Charge Temp | 39° C. | Not Provided |
| Maximum Charge Temp | 43° C. | Not Provided |
| Yuasa Suggested Max |  | 50° C. |
| Maximum Charge Voltage | 15.6 v | 14.5 v |
| Average Charge Voltage | 13.5 v | 13 v |
| Yuasa Suggested Max |  | 15.6 v |
| State of Charge Coulomb Counting | Discharged 7 ah to verify that cell received a 100% charge |  |
| Cycle Life Expectation | Excessive voltage and temperature affect Lead Acid cycle life. The PDI fast charge does not exceed safe levels. Therefore, sufficient cycle life is expected. |  |

Figure 14:
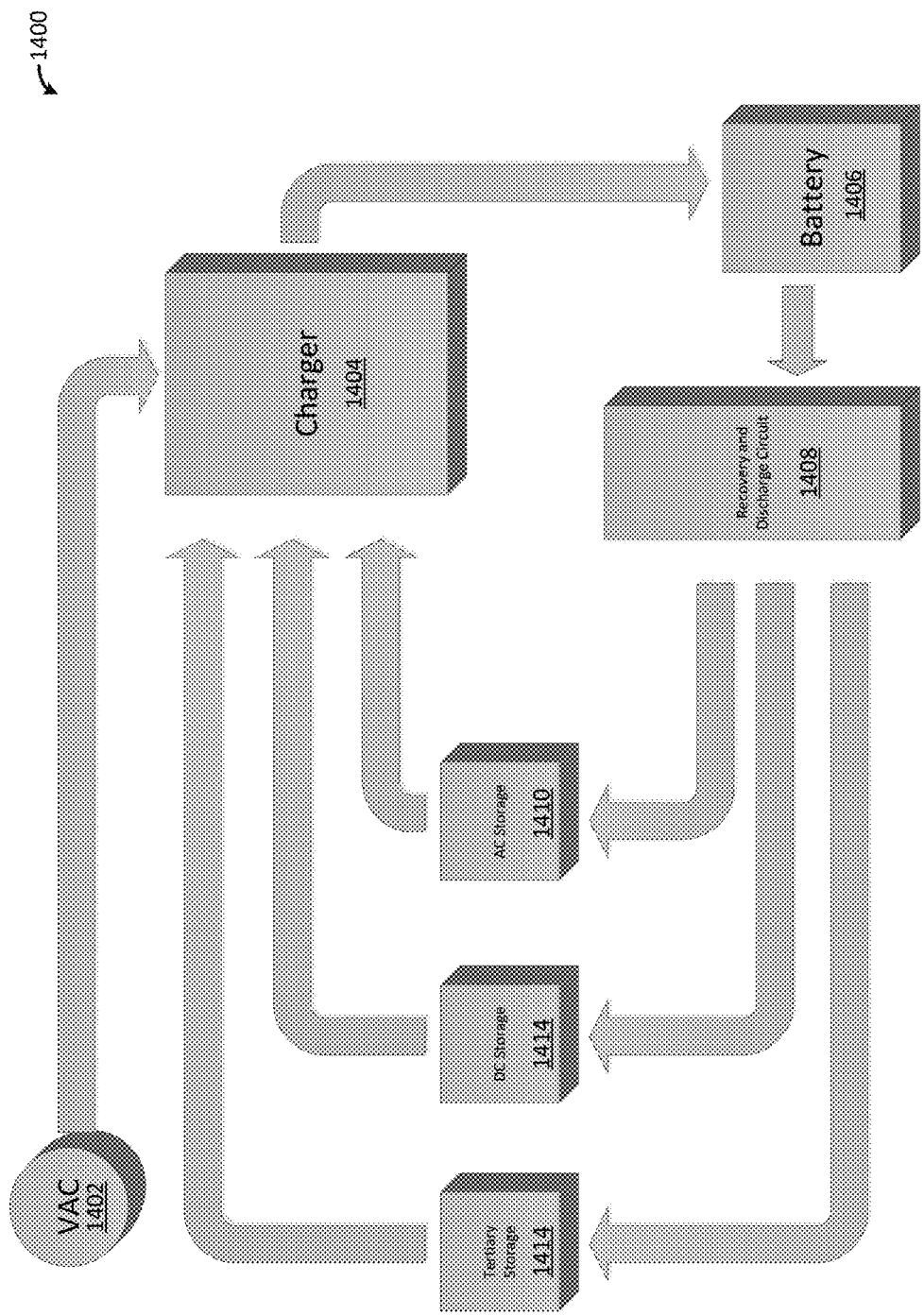
FIG. 14 is a block diagram of a battery charging system in accordance with one embodiment of the present invention.
Figure 15:
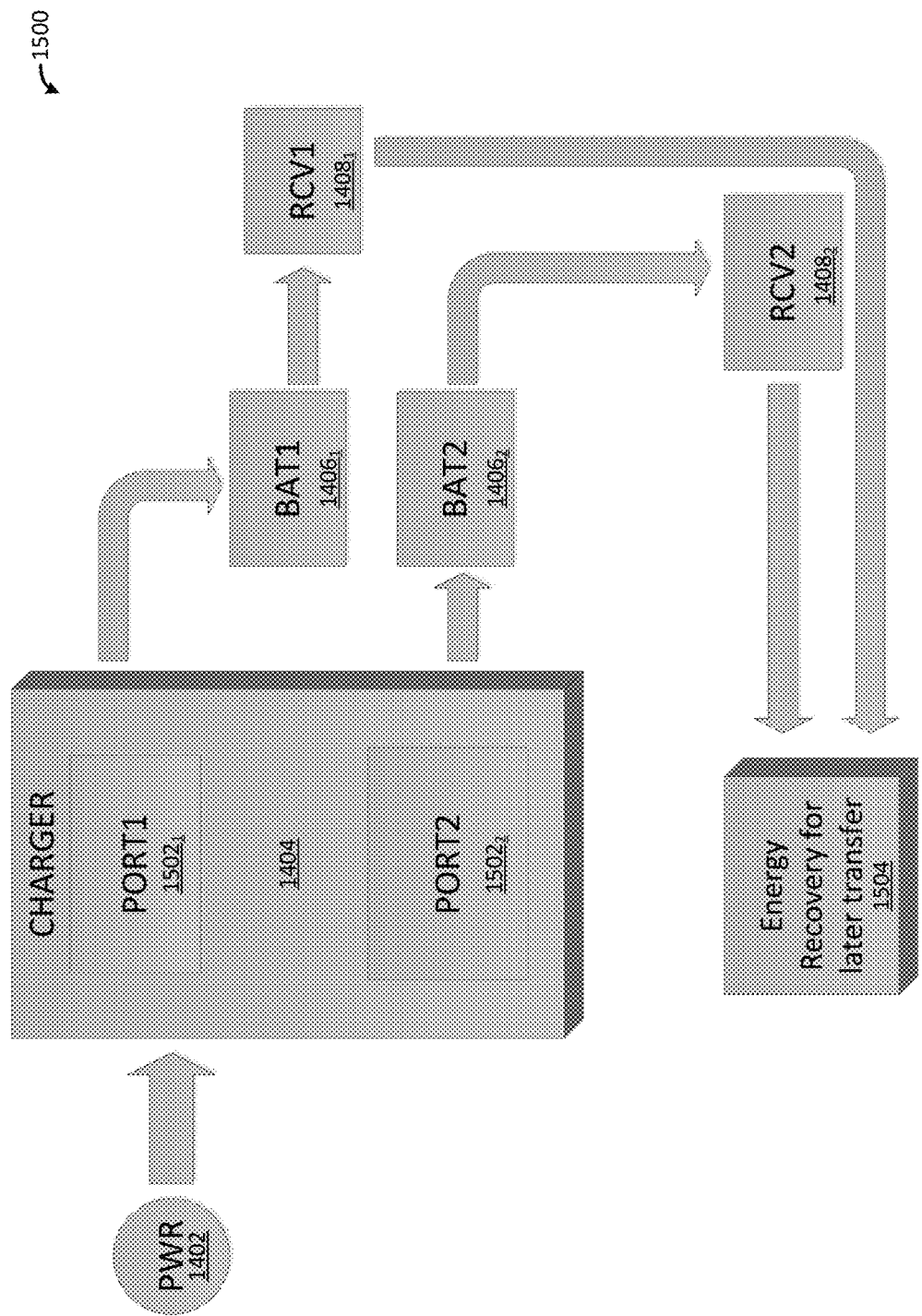
FIG. 15 is a block diagram of a battery charging system in accordance with another embodiment of the present invention.
Figure 16:
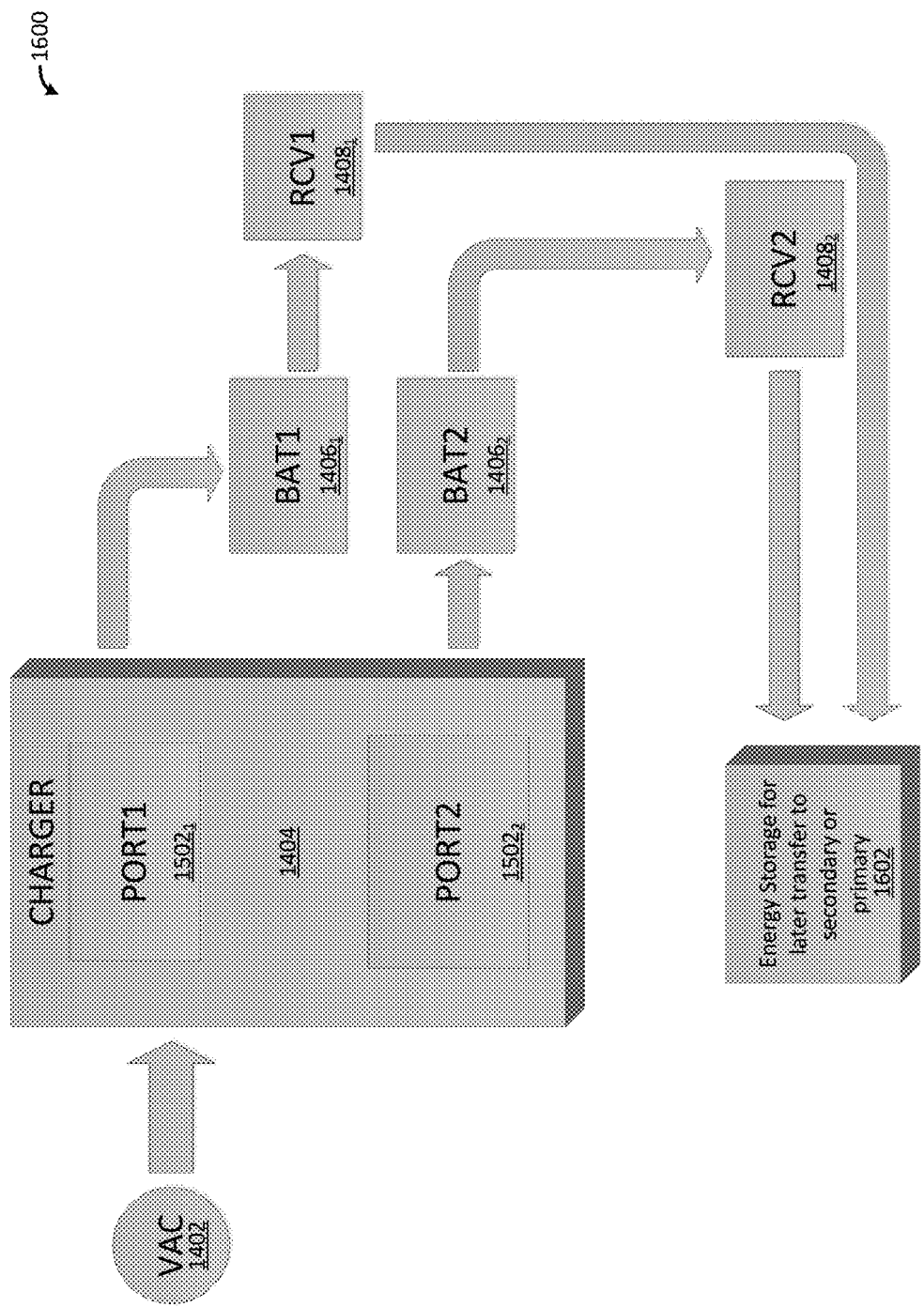
FIG. 16 is a block diagram of a battery charging system in accordance with another embodiment of the present invention.

FIGS. 14-16 depict several avenues of storing energy that is being discharged from the battery. Common to all three recycling locations is the recovery and discharge circuitry. (see e.g., FIGS. 18-19) The discharge energy can be stored for later use by the charging system in the three ways shown. The exact one chosen would depend upon the battery voltage, the charging current and the AC input voltage. These are generic implementations and are intended to show the flexibility in recovering the energy of the discharge pulse. All three recycling avenues can be galvanically isolated from the batteries using high frequency power processing. This provides the ability to virtually recycle the energy to any point in the power train.

FIGS. 15-16 depict implementations where two batteries $1406_1$ and $1406_2$ are charged concurrently. Both battery banks each have their own energy recovery circuitry $1408_1$ and $1408_2$ that can be processed in one of the ways shown in FIGS. 14-16. Each battery is charged from its respective port at a 50% duty cycle. The discharge pulse for each pack occurs when the other one is being charged. The significance of this implementation is that two batteries can be processed with one charger 1404 and in a rapid fashion. This will significantly reduce the charger cost per battery and reduce the recharge time by at least 50%.

Figure 18:
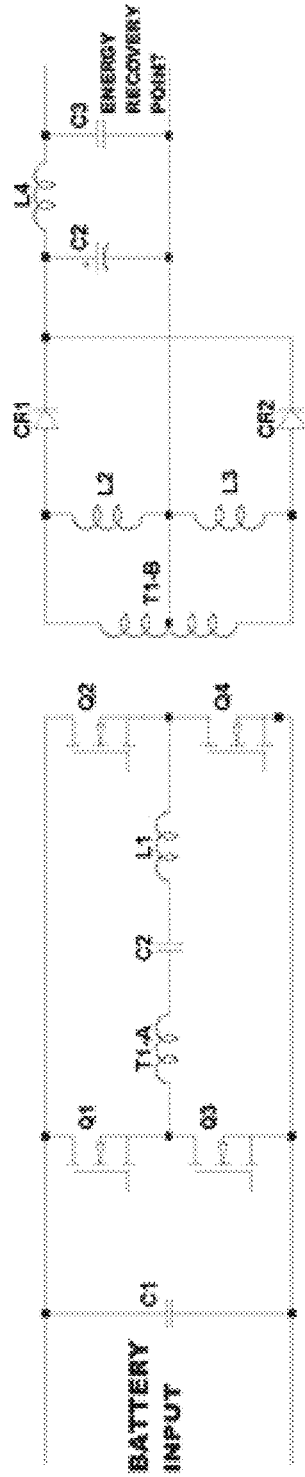
FIGS. 18 and 19 depict various simplified power processing circuits that can be used for recycling in accordance with the present invention.
Figure 19:
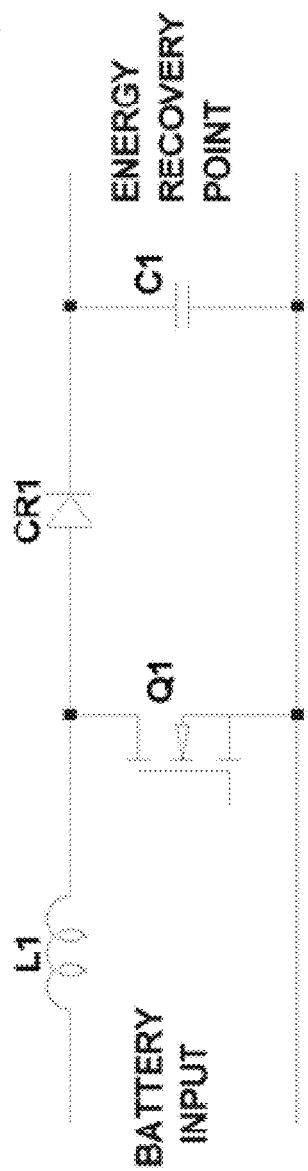

Now referring to FIG. 14, a block diagram of a battery charging system 1400 in accordance with one embodiment of the present invention is shown. The battery charging system 1400 includes a power source 1402 electrically connected to a battery charger 1404. The battery charger 1404 is electrically connected to a battery 1406, which is electrically connected to a recovery/discharge circuit 1408. The recovery/discharge circuit 1408 is electrically connected to an AC storage device 1410, a DC storage device 1412 and a tertiary storage device 1414. Each of the storage devices 1410, 1412 and 1414 are electrically connected back to the battery charger 1404. Examples of a recovery/discharge circuit 1408 are shown in FIGS. 18 and 19. Note that the recovery/discharge circuit 1408 or the storage devices 1410, 1412 and 1414 or any combination thereof can be integrated into the battery charger 1404.

Referring now to FIG. 15, a block diagram of a battery charging system 1500 in accordance with one embodiment of the present invention is shown. The battery charging system 1500 includes a power source 1402 electrically connected to a battery charger 1404 having a first port $1502_1$ and a second port $1502_2$. A first battery $1406_1$ is electrically connected to the first port $1502_1$ and a first recovery/discharge circuit $1408_1$. A second battery $1406_2$ is electrically connected to the second port $1502_2$ and a second recovery/discharge circuit $1408_2$. The first recovery/discharge circuit $1408_1$ and second recovery/discharge circuit $1408_2$ are electrically connected to an energy storage device 1504 for later transfer. Examples of the first and second recovery/discharge circuits $1408_1$ and $1408_2$ are shown in FIGS. 18 and 19. Note that the recovery/discharge circuits $1408_1$ and $1408_2$, or the energy storage device 1504, or any combination thereof can be integrated into the battery charger 1404.

Now referring to FIG. 16, a block diagram of a battery charging system 1600 in accordance with one embodiment of the present invention is shown. The battery charging system 1600 includes a power source 1402 electrically connected to a battery charger 1404 having a first port $1502_1$ and a second port $1502_2$. A first battery $1406_1$ is electrically connected to the first port $1502_1$ and a first recovery/discharge circuit $1408_1$. A second battery $1406_2$ is electrically connected to the second port $1502_2$ and a second recovery/discharge circuit $1408_2$. The first recovery/discharge circuit $1408_1$ and second recovery/discharge circuit $1408_2$ are electrically connected to an energy storage device 1602 for later transfer to the secondary or primary. Examples of the first and second recovery/discharge circuits $1408_1$ and $1408_2$ are shown in FIGS. 18 and 19. Note that the recovery/discharge circuits $1408_1$ and $1408_2$, or the energy storage device 1602, or any combination thereof can be integrated into the battery charger 1404.

Figure 17:
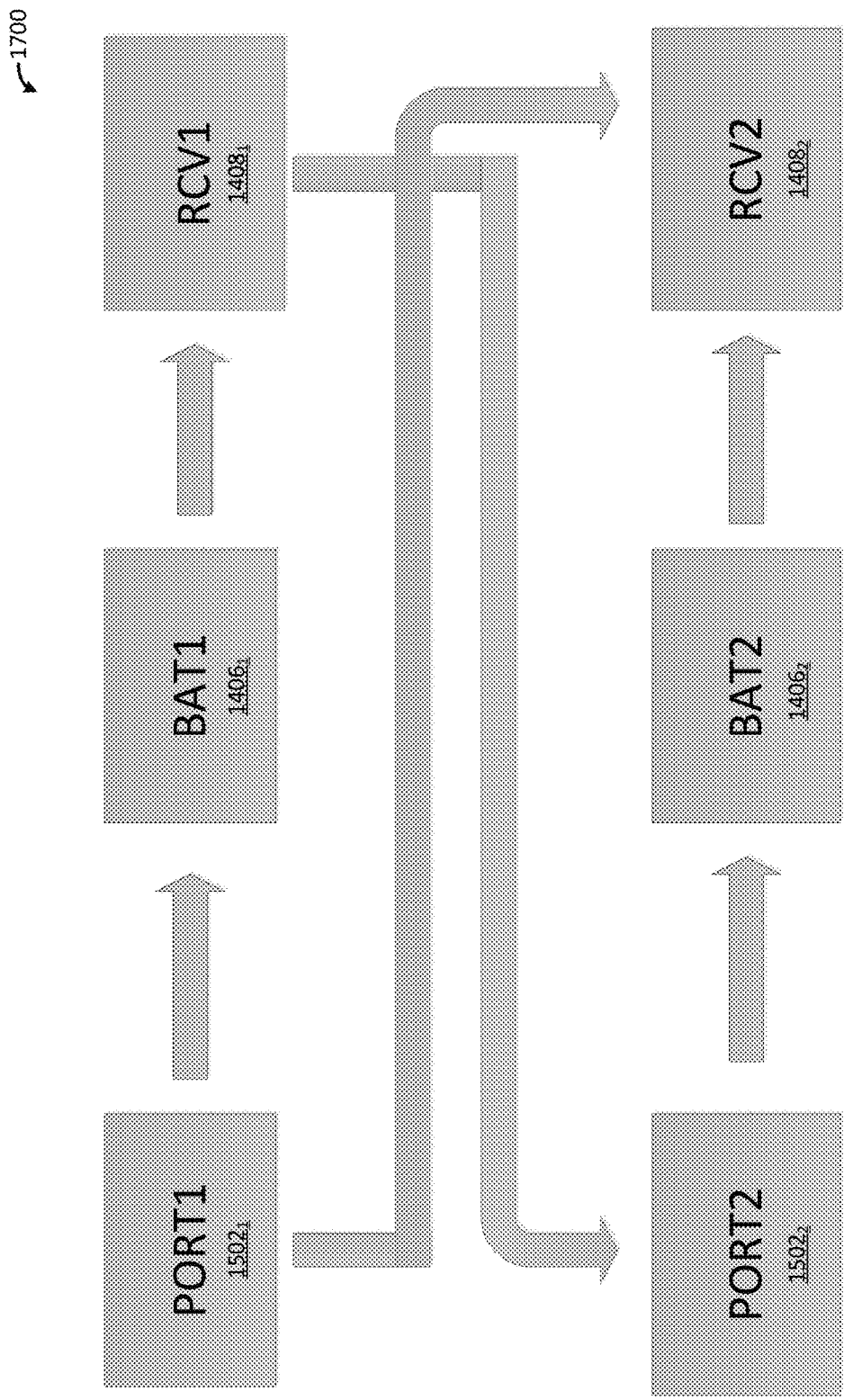
FIG. 17 is a block diagram of a battery charging system in accordance with another embodiment of the present invention.

Referring now to FIG. 17, a block diagram of a battery charging system 1700 in accordance with one embodiment of the present invention is shown. As described in FIGS. 15-16, a first battery 1406$_1$ is electrically connected to the first port 1502$_1$ and a first recovery/discharge circuit 1408$_1$, and a second battery 1406$_2$ is electrically connected to the second port 1502$_2$ and a second recovery/discharge circuit 1408$_2$. The first recovery/discharge circuit 1408$_1$ transfers energy back to the second port 1502$_2$ of the battery charger 1404 for use in the charging process. Likewise, second recovery/discharge circuit 1408$_2$ transfers energy back to the first port 1502$_1$ of the battery charger 1404 for use in the charging process. The energy recovery is "swapped" between the two batteries directly. This allows for a significant reduction in complexity over single battery systems. This swap is only possible for the two battery system. This would have particular attractiveness in the higher power applications.

Now referring to FIGS. 18 and 19, various simplified power processing circuits 1800 and 1900 that can be used for recycling in accordance with the present invention are shown. There are two fundamental types: isolated 1800 and non-isolated 1900. The difference is that the isolated circuits have no common path between input (battery) and output (energy recycling point). A high frequency transformer T1 is used for galvanic isolation. The non-isolated case is much simpler but has the limitation that it can only be used when the input (battery) and output (recycling) are at the same electrical ground reference point. Crucial to both designs is the control and monitoring to assure proper sequencing and electrical parameters during various states of charge. Note that other circuits can be used.

Figure 20:
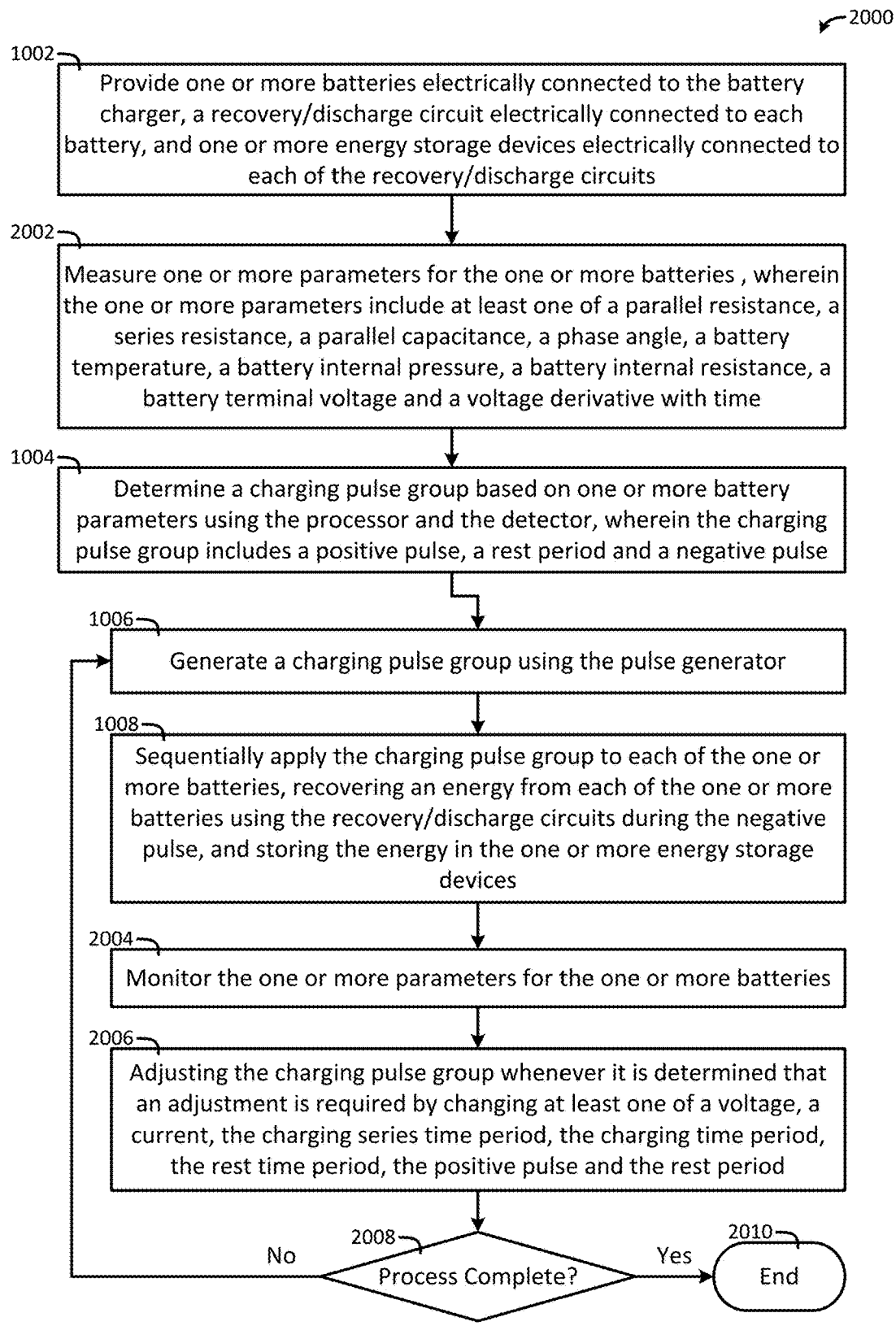
FIG. 20 is a flow chart of a method for charging two or more batteries with a battery charger in accordance with another embodiment of the present invention.

Referring now to FIG. 20, a flow chart of a method 2000 for charging one or more batteries with a battery charger in accordance with another embodiment of the present invention is shown. The method provides one or more batteries electrically connected to the battery charger, a recovery/discharge circuit electrically connected to each battery, and one or more energy storage devices electrically connected to each of the recovery/discharge circuits in block 2002. The battery charger includes a pulse generator, a detector and a processor communicably coupled to the pulse generator and the detector. One or more parameters of the one or more batteries are measured in block 2002. The one or more battery parameters may include at least one of a parallel resistance, a series resistance, a parallel capacitance, a phase angle, a battery temperature, a battery internal pressure, a battery internal resistance, a battery terminal voltage and a voltage derivative with time. A charging series time period, a charging time period and a rest time period are determined based on one or more battery parameters using the processor and the detector in block 1004. The charging time period is approximately equal to the charging series time period divided by the number of batteries and the rest time period is approximately equal to the charging series time period minus the charging time period. A charging pulse group is determined based on one or more battery parameters using the processor and the detector in block 1004. The charging pulse group comprises a positive pulse, a rest period and a negative pulse. The negative pulse can immediately precede the positive pulse, or immediately follow the positive pulse, or be in between (does not immediately follow the positive pulse and does not immediately precede the positive pulse). A charging pulse group is generated using the pulse generator in block 1006. The charging pulse group is sequentially applied to each of the one or more batteries, an energy is recovered from each of the one or more batteries using the recovery/discharge circuits during the negative pulse, and the energy is stored in the one or more energy storage devices in block 1008. The one or more parameters of the two or more batteries are monitored using the detector in block 2004. The charging pulse group is adjusted in block 2006 whenever it is determined that an adjustment is required using the processor. The adjustments to the charging pulse group may include changing at least one of a voltage, a current, the charging series time period, the charging time period, the rest time period, the positive pulse, the rest period, or other parameters. Note that the adjustments can be performed on each battery such that the charging pulse group includes a first charging pulse group for a first battery and a second charging pulse group for a second battery. If the process is complete, as determined in decision block 2008, the process ends in block 2010. The process may be complete when the two or more batteries are substantially charged, a specified charge level is obtained, or a specified charging time period has elapsed. If, however, the process is not complete, as determined in decision block 2008, the process loops back to block 1006 and repeats as previously described.

The step of providing the number of batteries electrically connected to the battery charger (step 1002) may include the step of electrically connecting the one or more batteries to the battery charger and the recovery/discharge circuit. The method 2000 may also include the steps of generating a discharge pulse using the pulse generator, applying the discharge pulse to each of the one or more batteries, and detecting the one or more battery parameters using the detector. Moreover, the method 2000 may include the step of measuring the one or more parameters of the one or more batteries. The one or more energy storage devices may include an AC storage device, a DC storage device, a tertiary storage device, or a combination thereof. The energy stored in the one or more energy storage devices can be used to recharge the one or more batteries.

Figures 21, 22, 23:
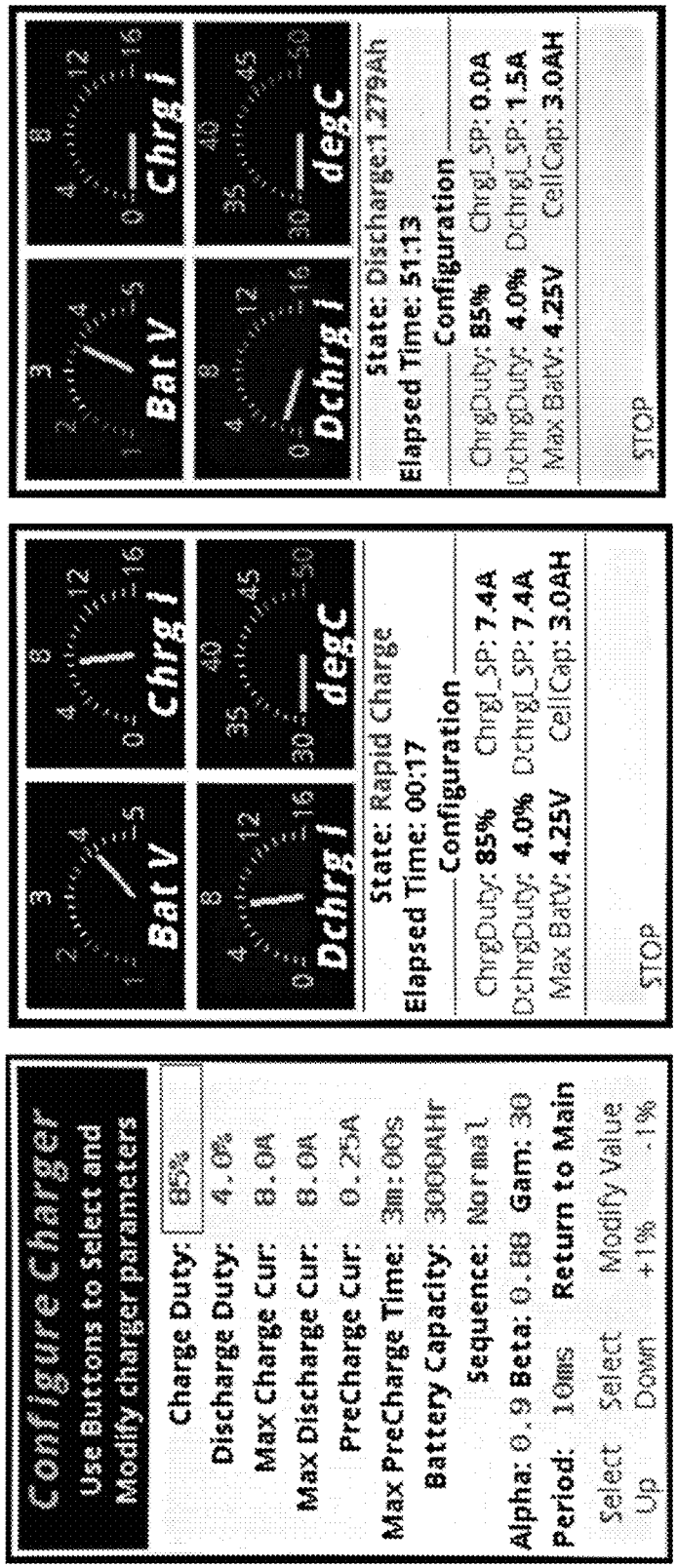
FIGS. 21-25 depict examples of various screens and waveforms of a battery charger in accordance with another embodiment of the present invention.
Figure 24:
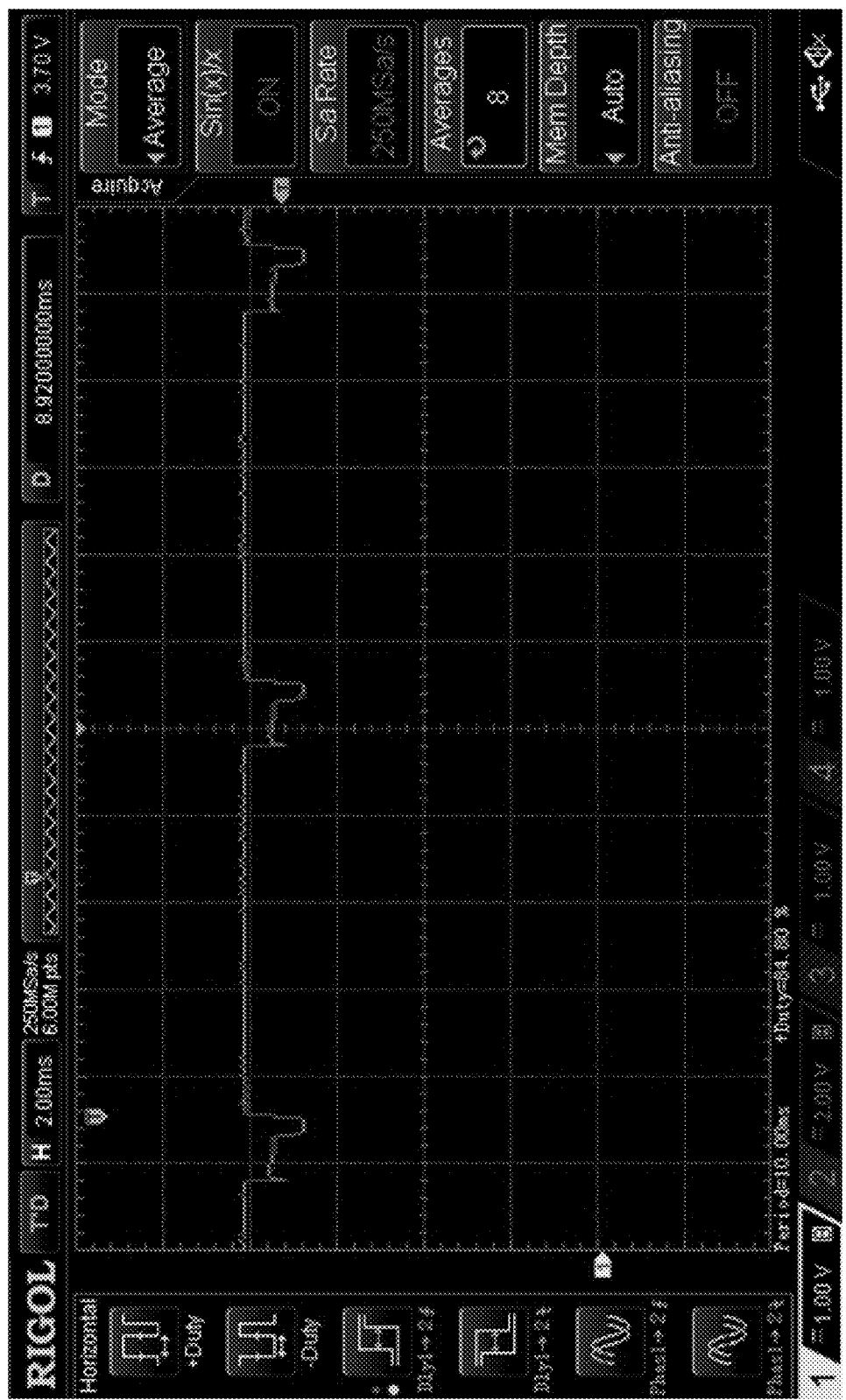
Figure 25:
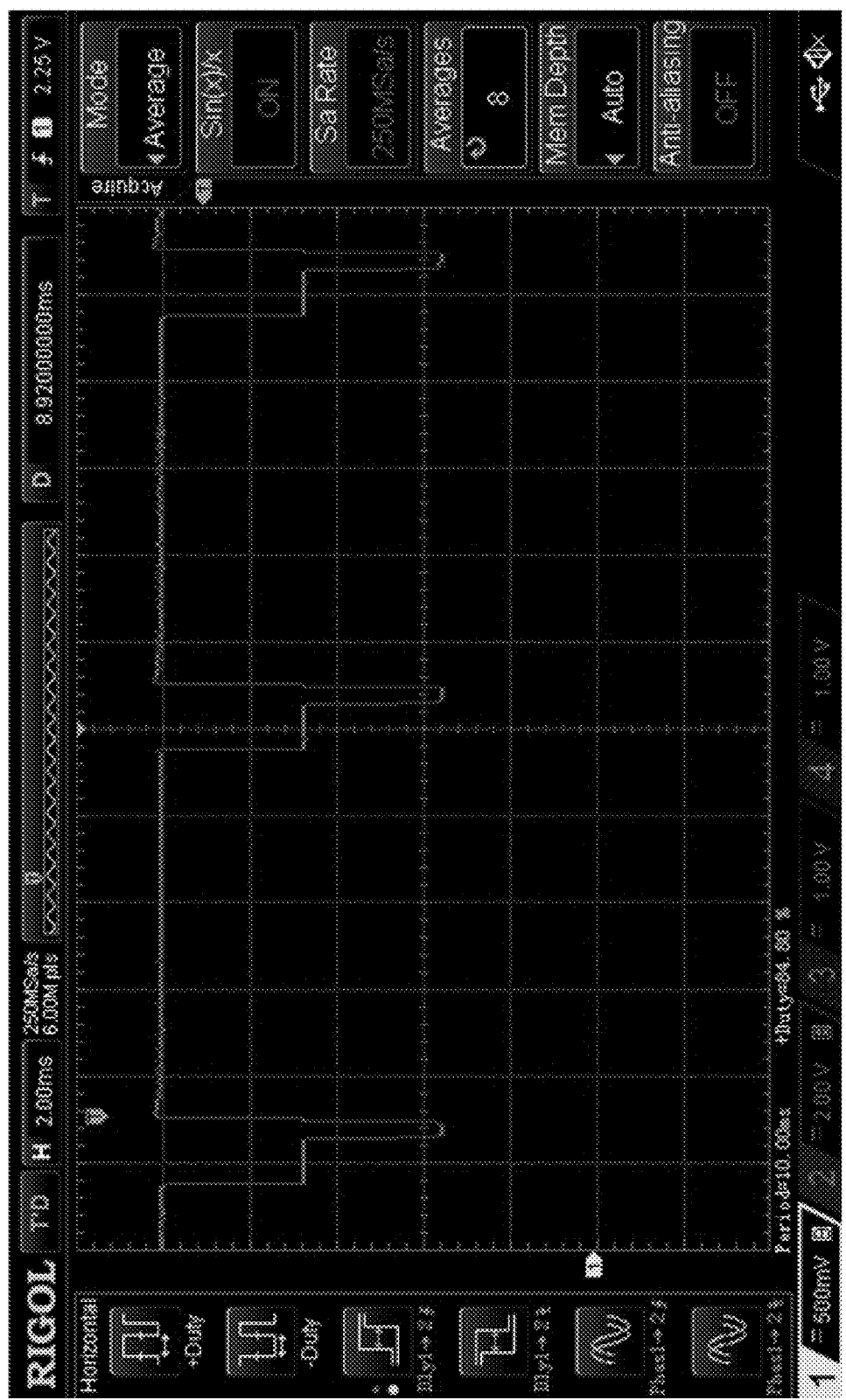

Now referring to FIGS. 21-25, examples of various screens and waveforms of a battery charger in accordance with another embodiment of the present invention are shown. FIG. 21 depicts a configuration screen. FIG. 22 depicts a charging screen. FIG. 23 depicts a discharge screen. FIG. 24 depicts a battery voltage. FIG. 25 depicts a rapid charge current.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not that particular function is activated, turned on, or unlocked, as long as that apparatus, system, or component is so adapted, arranged, capable, configured, enabled, operable, or operative.

What is claimed is:

1. A method for charging one or more batteries with a battery charger, comprising the steps of:
   providing one or more batteries electrically connected to the battery charger, a recovery circuit electrically connected to each battery, and one or more energy storage devices electrically connected to each of the recovery circuits, wherein the battery charger comprises a pulse generator, a detector and a processor communicably coupled to the pulse generator and the detector;
   determining a charging pulse group based on one or more battery parameters using the processor and the detector, wherein the charging pulse group comprises a positive pulse, a rest period and a negative pulse;
   generating the charging pulse group using the pulse generator;
   sequentially applying the charging pulse group to each of the one or more batteries, recovering an energy from each of the one or more batteries using the recovery circuits during the negative pulse, and storing the energy in the one or more energy storage devices; and
   monitoring the one or more parameters of the one or more batteries and determining whether to adjust the charging pulse group for the one or more batteries using the processor and the detector.

2. The method as recited in claim 1, further comprising the step of measuring the one or more parameters of the one or more batteries, wherein the one or more battery parameters comprise at least one of a parallel resistance, a series resistance, a parallel capacitance, a phase angle, a battery temperature, a battery internal pressure, a battery internal resistance, a battery terminal voltage and a voltage derivative with time.

3. The method as recited in claim 1, wherein the negative pulse immediately precedes the positive pulse.

4. The method as recited in claim 1, wherein the negative pulse immediately follows the positive pulse.

5. The method as recited in claim 1, wherein the step of providing the one or more batteries electrically connected to the battery charger comprises the step of electrically connecting the one or more batteries to the battery charger.

6. The method as recited in claim 1, further comprising the step of using the energy stored in the one or more energy storage devices to recharge the one or more batteries.

7. The method as recited in claim 1, wherein the one or more energy storage devices comprise an AC storage device, a DC storage device, a tertiary storage device, or a combination thereof.

8. The method as recited in claim 1, further comprising the steps of:
   generating a discharge pulse using the pulse generator;
   applying the discharge pulse to each of the one or more batteries; and
   detecting the one or more battery parameters using the detector.

9. The method as recited in claim 1, wherein the monitoring step further comprises the step of adjusting the charging pulse group for the one or more batteries using the processor and the detector by changing at least one of a voltage, a current, the charging series time period, the charging time period, the rest time period, the positive pulse and the rest period.

10. The method as recited in claim 9, wherein the adjusting step is performed on each battery such that the charging pulse group comprises a first charging pulse group for a first battery and a second charging pulse group for a second battery.

11. The method as recited in claim 9, wherein the generating step, sequentially applying step, monitoring step and the adjusting step are repeated until the one or more batteries are substantially charged, a specified charge level is obtained, or a specified charging time period has elapsed.

12. A method for charging one or more batteries with a battery charger, comprising the steps of:
   providing one or more batteries electrically connected to the battery charger, a recovery circuit electrically connected to each battery, and one or more energy storage devices electrically connected to each of the recovery circuits, wherein the battery charger comprises a pulse generator, a detector and a processor communicably coupled to the pulse generator and the detector;
   measuring one or more parameters of the one or more batteries, wherein the one or more battery parameters comprise at least one of a parallel resistance, a series resistance, a parallel capacitance, a phase angle, a battery temperature, a battery internal pressure, a battery internal resistance, a battery terminal voltage and a voltage derivative with time;
   determining a charging pulse group based on one or more battery parameters using the processor and the detector, wherein the charging pulse group comprises a positive pulse, a rest period and a negative pulse;
   generating the charging pulse group using the pulse generator;
   sequentially applying the charging pulse group to each of the one or more batteries, recovering an energy from each of the one or more batteries using the recovery circuits during the negative pulse, and storing the energy in the one or more energy storage devices;
   monitoring the one or more parameters of the one or more batteries using the detector;
   adjusting the charging pulse group whenever the processor determines that an adjustment is required by changing at least one of a voltage, a current, the charging series time period, the charging time period, the rest time period, the positive pulse and the rest period; and
   repeating the generating step, the sequentially applying step, the monitoring step and the adjusting step until the one or more batteries are substantially charged, a specified charge level is obtained, or a specified charging time period has elapsed.

13. The method as recited in claim 12, wherein the negative pulse immediately precedes the positive pulse.

14. The method as recited in claim 12, wherein the negative pulse immediately follows the positive pulse.

15. The method as recited in claim 12, wherein the step of providing the one or more batteries electrically connected to the battery charger comprises the step of electrically connecting the one or more batteries to the battery charger.

16. The method as recited in claim 12, further comprising the step of using the energy stored in the one or more energy storage devices to recharge the one or more batteries.

17. The method as recited in claim 12, wherein the one or more energy storage devices comprise an AC storage device, a DC storage device, a tertiary storage device, or a combination thereof.

18. The method as recited in claim 12, further comprising the steps of:
generating a discharge pulse using the pulse generator;
applying the discharge pulse to each of the one or more batteries; and
detecting the one or more battery parameters using the detector.

19. The method as recited in claim 12, wherein the adjusting step is performed on each battery such that the charging pulse group comprises a first charging pulse group for a first battery and a second charging pulse group for a second battery.

20. A battery charging system for one or more batteries, comprising:
a battery charger comprising:
a pulse generator configured to generate a charging pulse group comprising comprises a positive pulse, a rest period and a negative pulse and sequentially applying the charging pulse group to each of the one or more batteries,
a detector configured to monitor one or more parameters of the one or more batteries, and
a processor communicably coupled to the pulse generator and the detector, the processor configured to determine the charging pulse group and determine whether to adjust the charging pulse group for the one or more batteries;
a recovery circuit electrically connected to each battery, wherein each recovery circuit 1s configured to recover an energy from each battery during the negative pulse; and
one or more energy storage devices electrically connected to each of the recovery circuits, wherein each energy storage device is configured to store the energy recovered from the recovery circuits.

21. The battery charging system as recited in claim 20, wherein the detector is further configured to measure the one or more parameters of the one or more batteries, wherein the one or more battery parameters comprise at least one of a parallel resistance, a series resistance, a parallel capacitance, a phase angle, a battery temperature, a battery internal pressure, a battery internal resistance, a battery terminal voltage and a voltage derivative with time.

22. The battery charging system as recited in claim 20, wherein the negative pulse immediately precedes the positive pulse.

23. The battery charging system as recited in claim 20, wherein the negative pulse immediately follows the positive pulse.

24. The battery charging system as recited in claim 20, wherein the recovery/discharge circuit comprises an isolated circuit having a high frequency transformer as substantially shown in FIG. 18 or a non-isolated circuit as substantially shown in FIG. 19.

25. The battery charging system as recited in claim 20, wherein the processor is further configured to adjust the charging pulse group for the one or more batteries using the processor and the detector by changing at least one of a voltage, a current, the charging series time period, the charging time period, the rest time period, the positive pulse and the rest period.

26. The battery charging system as recited in claim 22, wherein the charging pulse is adjusted for each battery such that the charging pulse group comprises a first charging pulse group for a first battery and a second charging pulse group for a second battery.

27. The battery charging system as recited in claim 22, wherein the processor is configured to charge the one or more batteries until the one or more batteries are substantially charged, a specified charge level is obtained, or a specified charging time period has elapsed.

28. A method for charging one or more cells within a battery with a battery charger, comprising the steps of:
providing the battery having one or more cells electrically connected to the battery charger, a recovery circuit electrically connected to each cell, and one or more energy storage devices electrically connected to each of the recovery circuits, wherein the battery charger comprises a pulse generator, a detector and a processor communicably coupled to the pulse generator and the detector;
determining a charging pulse group based on one or more cell parameters using the processor and the detector, wherein the charging pulse group comprises a positive pulse, a rest period and a negative pulse;
generating the charging pulse group using the pulse generator;
sequentially applying the charging pulse group to each of the one or more cells, recovering an energy from each of the one or more cells using the recovery circuits during the negative pulse, and storing the energy in the one or more energy storage devices; and
monitoring the one or more parameters of the one or more cells and determining whether to adjust the charging pulse group for the one or more cells using the processor and the detector.

29. A battery charging system for one or more cells within a battery, comprising:
a battery charger comprising:
a pulse generator configured to generate a charging pulse group comprising
comprises a positive pulse, a rest period and a negative pulse and sequentially applying the charging pulse group to each of the one or more cells,
a detector configured to monitor one or more parameters of the one or more cells, and a processor communicably coupled to the pulse generator and the detector, the processor configured to determine the charging pulse group and determine whether to adjust the charging pulse group for the one or more cells;
a recovery circuit electrically connected to each cell, wherein each recovery circuit is configured to recover an energy from each cell during the negative pulse; and
one or more energy storage devices electrically connected to each of the recovery circuits, wherein each energy storage device is configured to store the energy recovered from the recovery circuits.

* * * * *